United States Patent
Kajiyama et al.

(10) Patent No.: US 10,895,724 B2
(45) Date of Patent: Jan. 19, 2021

(54) OPTICAL SYSTEM HAVING REFRACTING SURFACE AND REFLECTING SURFACE, AND IMAGE CAPTURING APPARATUS AND PROJECTION APPARATUS INCLUDING THE SAME

(71) Applicant: CANON KABUSHIKI KAISHA, Tokyo (JP)

(72) Inventors: Kazuhiko Kajiyama, Utsunomiya (JP); Koji Maezawa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 106 days.

(21) Appl. No.: 16/042,990

(22) Filed: Jul. 23, 2018

(65) Prior Publication Data
US 2019/0033567 A1    Jan. 31, 2019

(30) Foreign Application Priority Data
Jul. 26, 2017 (JP) ................................. 2017-144397

(51) Int. Cl.
*G02B 17/08* (2006.01)
*B60W 30/09* (2012.01)
*B60W 50/14* (2020.01)

(52) U.S. Cl.
CPC .......... *G02B 17/0804* (2013.01); *B60W 30/09* (2013.01); *B60W 50/14* (2013.01);
(Continued)

(58) Field of Classification Search
CPC ........... G02B 17/0804; G02B 17/0808; G02B 17/0812; G02B 17/0816; G02B 17/082;
(Continued)

(56) References Cited

U.S. PATENT DOCUMENTS

| 2,684,015 A | * | 7/1954 | Grey | .................. G02B 17/0852 359/351 |
| 4,812,028 A | * | 3/1989 | Matsumoto | ........ G02B 17/0828 359/366 |

(Continued)

FOREIGN PATENT DOCUMENTS

| CH | 256273 A | 8/1948 |
| CN | 101216597 A | 7/2008 |

(Continued)

*Primary Examiner* — Jordan M Schwartz
(74) *Attorney, Agent, or Firm* — Canon U.S.A., Inc.

(57) ABSTRACT

An optical system includes a first optical element including a first reflecting region having a convex shape toward an enlargement side, a second optical element having a reduction-side surface having a convex shape toward the enlargement side, and a third optical element having an enlargement-side surface having a convex shape toward the enlargement side, wherein the reduction-side surface of the second optical element or the enlargement-side surface of the third optical element includes a second reflecting region, wherein the third optical element includes a refracting region having positive power, and wherein light from the enlargement side proceeds to a reduction side sequentially through a refracting region of the first optical element, the second reflecting region, the first reflecting region, a refracting region of the second optical element, and the refracting region of the third optical element.

21 Claims, 12 Drawing Sheets

(52) U.S. Cl.
CPC ..... *G02B 17/0812* (2013.01); *G02B 17/0836* (2013.01); *G02B 17/0856* (2013.01); *G02B 17/0876* (2013.01); *G02B 17/0896* (2013.01); *B60W 2050/143* (2013.01)

(58) Field of Classification Search
CPC ............ G02B 17/0824; G02B 17/0836; G02B 17/084; G02B 17/0876; G02B 17/0856
USPC .................................................. 359/729–732
See application file for complete search history.

(56) References Cited

U.S. PATENT DOCUMENTS

| | | | |
|---|---|---|---|
| 5,652,679 A | | 7/1997 | Freeman |
| 5,659,430 A | | 8/1997 | Togino |
| 2007/0153398 A1 | | 7/2007 | Shafer |
| 2010/0053783 A1* | | 3/2010 | Murasato ............... G02B 7/023 |
| | | | 359/819 |
| 2012/0081509 A1* | | 4/2012 | Kormann ............... B60R 1/002 |
| | | | 348/36 |

FOREIGN PATENT DOCUMENTS

| | | |
|---|---|---|
| JP | 08-166542 A | 6/1996 |
| JP | 2003-177321 A | 6/2003 |
| JP | 2003-215458 A | 7/2003 |
| JP | 2004-361777 A | 12/2004 |
| WO | 94/06047 A1 | 3/1994 |
| WO | 2010129039 A1 | 11/2010 |
| WO | 2017/039712 A1 | 3/2017 |

* cited by examiner

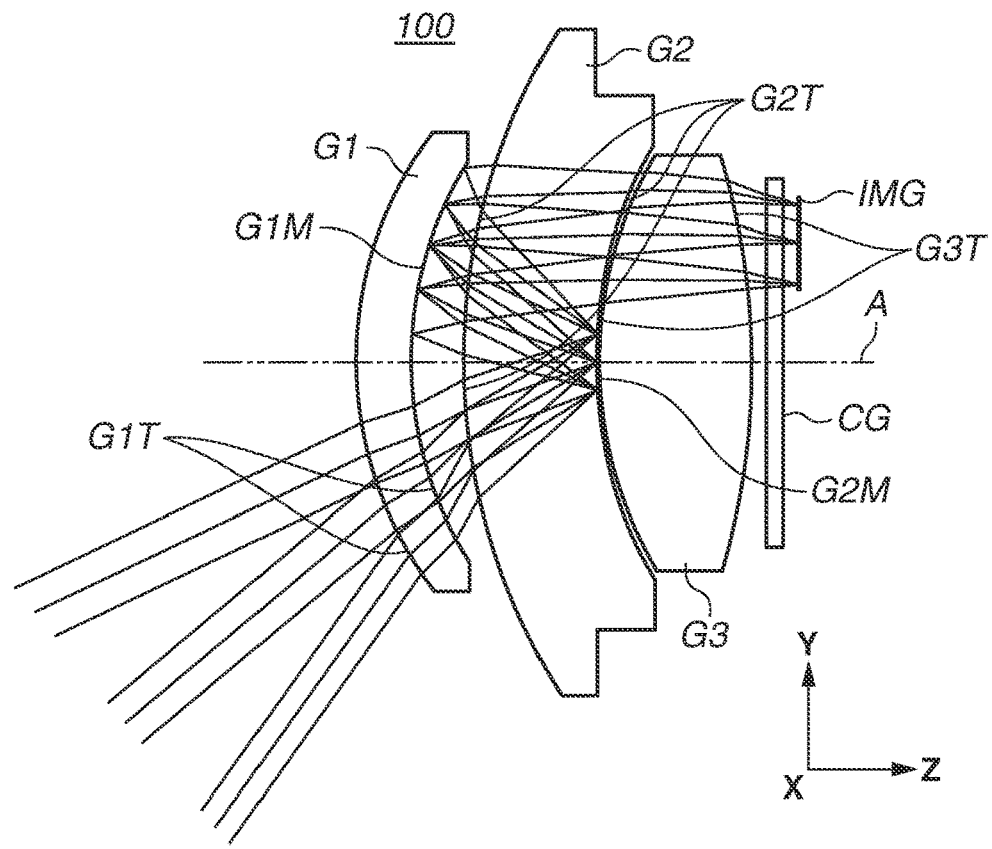
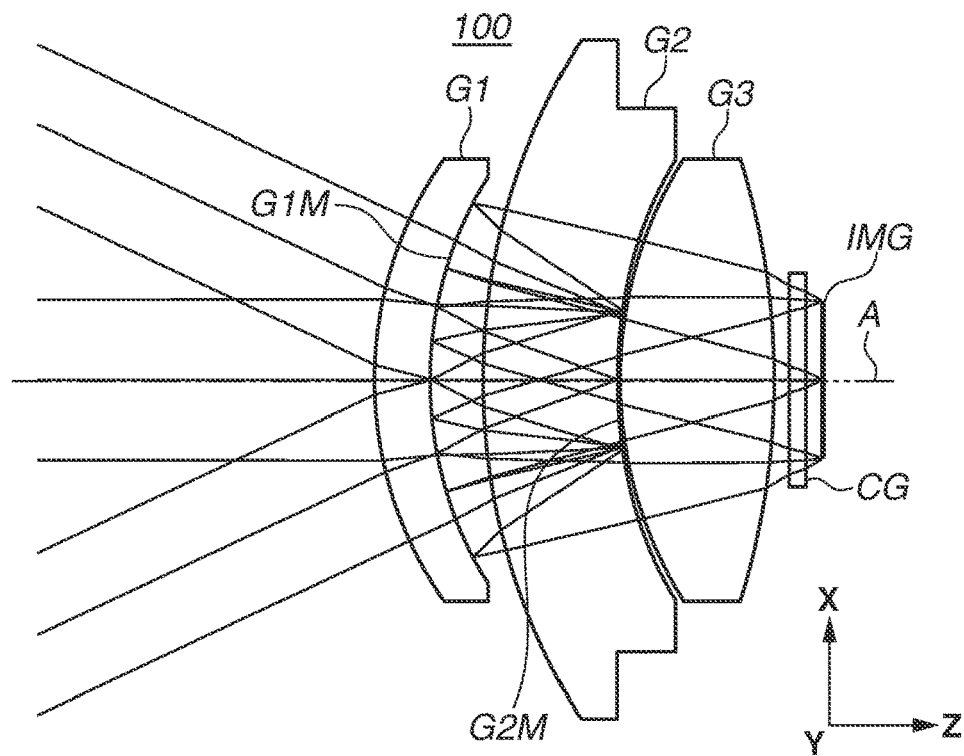

OPTICAL SYSTEM HAVING REFRACTING SURFACE AND REFLECTING SURFACE, AND IMAGE CAPTURING APPARATUS AND PROJECTION APPARATUS INCLUDING THE SAME

BACKGROUND OF THE INVENTION

Field of the Invention

The present invention relates to an optical system having a refracting surface and a reflecting surface and is suitable for an image capturing apparatus, such as a digital still camera, a digital video camera, an in-vehicle camera, a mobile phone camera, a monitoring camera, a wearable camera, or a medical camera, and a projection apparatus, such as a projector.

Description of the Related Art

As an optical system for use in an image capturing apparatus or a projection apparatus, a catadioptric system downsized by using a reflecting surface and a refracting surface is known. Japanese Patent Application Laid-Open No. 2003-215458 discusses a catadioptric system in which two catadioptric elements, each including a reflecting surface and a refracting surface, are provided. Further, Japanese Patent Application Laid-Open No. 2003-177321 discusses a catadioptric system including two refractive elements, a single reflecting element (a back surface mirror), and a single catadioptric element.

The catadioptric system according to Japanese Patent Application Laid-Open No. 2003-215458, however, only includes two catadioptric elements. Thus, it is difficult to sufficiently correct various types of aberration. Further, in the catadioptric system according to Japanese Patent Application Laid-Open No. 2003-177321, the refractive elements need to be placed on the physical body side of the reflecting element. Thus, it is difficult to sufficiently downsize the entire system.

SUMMARY OF THE INVENTION

The present invention is directed to providing an optical system that is small-sized but has high image forming performance.

According to an aspect of the present invention, an optical system includes a first optical element including a first reflecting region having a convex shape toward an enlargement side, a second optical element having a reduction-side surface having a convex shape toward the enlargement side, and a third optical element having an enlargement-side surface having a convex shape toward the enlargement side, wherein the reduction-side surface of the second optical element or the enlargement-side surface of the third optical element includes a second reflecting region, wherein the third optical element includes a refracting region having positive power, and wherein light from the enlargement side proceeds to a reduction side sequentially via a refracting region of the first optical element, the second reflecting region, the first reflecting region, a refracting region of the second optical element, and the refracting region of the third optical element.

Further features of the present invention will become apparent from the following description of exemplary embodiments with reference to the attached drawings.

BRIEF DESCRIPTION OF THE DRAWINGS

FIG. 1A is a schematic diagram of a main part of an optical system according to a first exemplary embodiment of the present invention (a YZ cross section). FIG. 1B is a schematic diagram of the main part of the optical system according to the first exemplary embodiment (as viewed from a +Y side).

DESCRIPTION OF THE EMBODIMENTS

Figure 2:
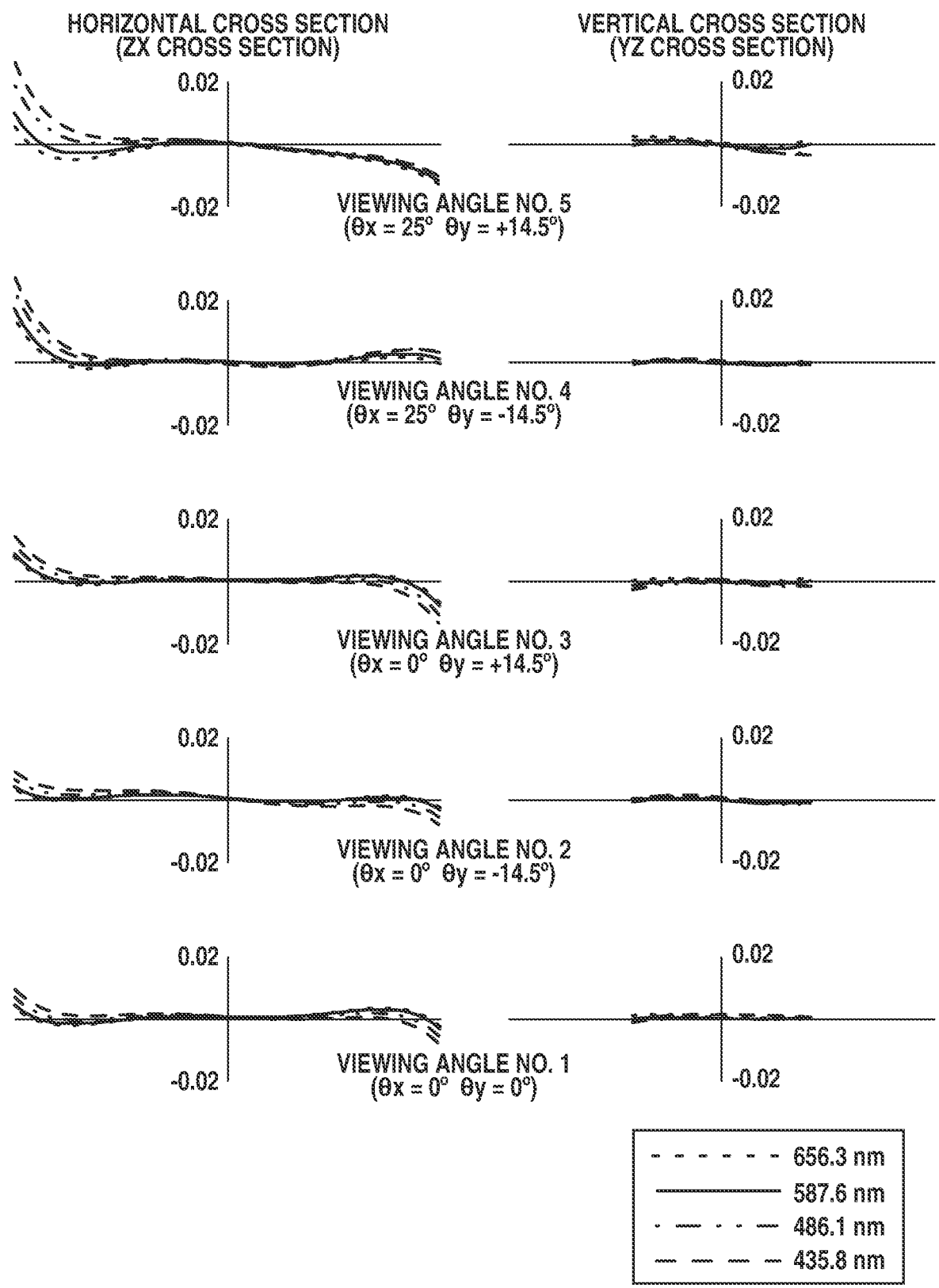
FIG. 2 is a lateral aberration diagram of the optical system according to the first exemplary embodiment.

With reference to the drawings, desirable exemplary embodiments of the present invention will be described below. Each of the embodiments of the present invention described below can be implemented solely or as a combination of a plurality of the embodiments or features thereof where necessary or where the combination of elements or features from individual embodiments in a single embodiment is beneficial. The drawings may be in sizes different from the actual sizes for convenience. Further, in the drawings, similar members are designated by the same reference numbers, and any repetitive description will be avoided. In the present exemplary embodiment, an "optical surface" refers to a refracting surface or a reflecting surface. An "optical axis" refers to an axis passing through the centers (the surface vertices) of optical surfaces in an optical system. A "distance" refers to a surface distance on an optical axis.

FIG. 1A is a schematic diagram of a main part of an optical system 100 according to an exemplary embodiment of the present invention, taken along a YZ cross section (a vertical cross section) including an optical axis A. FIG. 1B is a schematic diagram of the main part of the optical system 100 as viewed from a +Y side in a Y-direction (a vertical direction). FIG. 1B illustrates a beam proceeding to a center image height in the Y-direction. In FIGS. 1A and 1B, the left side (a −Z side) is an enlargement side, and the right side (a +Z side) is a reduction side. The optical system 100 according to the present exemplary embodiment is an image forming optical system for collecting a beam from a physical body (an object) (not illustrated) to form an image of the physical body and is applicable to an image capturing apparatus or a projection apparatus. In the case where the optical system is employed as an image capturing optical system, the enlargement side is the object side (or physical body side) of the optical system, and the reduction side is the image side (or image plane side) of the optical system. In the case where the optical system is employed as a projection optical system, the enlargement side is the image side of the optical system, and the reduction side is the object side of the optical system.

In a case where the optical system 100 is applied as an image capturing optical system to an image capturing apparatus, a reduction plane of the optical system 100 is an image plane, and an imaging surface (a light-receiving surface) of an image sensor, such as a charge-coupled device (CCD) sensor or a complementary metal-oxide-semiconductor (CMOS) sensor, is placed at the position of the image plane. Further, in a case where the optical system 100 is applied as a projection optical system to a projection apparatus, the reduction plane is a physical body plane, and a display surface of a display element, such as a liquid crystal panel (a spatial modulator), is placed at the position of the physical body plane. That is, between the image capturing optical system and the projection optical system, the physical body side and the image side are reversed, and the direction of an optical path is opposite. In the following description, a case is assumed where the optical system 100 is applied to an image capturing apparatus.

The optical system 100 according to the present exemplary embodiment is a catadioptric system having a first optical element G1, a second optical element G2, and a third optical element G3. The first optical element G1 includes a first reflecting region G1M, which has a convex shape toward the enlargement side (the physical body side). The second optical element G2 includes a reduction-side surface having a convex shape toward the enlargement side. The third optical element G3 includes an enlargement-side surface having a convex shape toward the enlargement side. Then, the reduction-side surface of the second optical element G2 includes a second reflecting region G2M. Alternatively, the second reflecting region G2M may be provided not on the reduction-side surface of the second optical element G2 but on the enlargement-side surface of the third optical element G3.

At this time, light from the enlargement side proceeds to the reduction side (the image side) sequentially via (or through) a refracting region G1T of the first optical element G1, the second reflecting region G2M, the first reflecting region G1M, a refracting region G2T of the second optical element G2, and a refracting region G3T of the third optical element G3 and forms an image plane IMG. As described above, the optical system 100 includes the first reflecting region G1M, which is a reflecting surface having positive power (a concave reflecting surface), and the second reflecting region G2M, which is a reflecting surface having negative power (a convex reflecting surface). Therefore, it is possible to downsize the optical system 100 by folding an optical path and also suppress the occurrence of aberration. In this case, the placement of the first reflecting region G1M and the second reflecting region G2M is similar to that of a Schwarzschild optical system. Thus, it is possible to achieve an optical system of which the stop value (the F-number) is small and which is bright.

Further, in the optical system 100 according to the present exemplary embodiment, the first optical element G1 including a concave reflecting surface is a catadioptric element. Thus, it is possible to downsize the entire system by suppressing an increase in the number of optical elements and also excellently correct aberration. Further, the third optical element G3 according to the present exemplary embodiment includes the refracting region G3T having positive power. Consequently, it is possible to excellently correct aberration, such as comatic aberration occurring in the refracting region G2T on the reduction-side surface of the second optical element G2, which has the second reflecting region G2M that is a convex reflecting surface. Thus, even in a small-sized configuration in which the first optical element G1 and the second optical element G2 are catadioptric elements, it is possible to achieve high image forming performance.

An optical system 100 according to a first exemplary embodiment of the present invention is described below. The optical system 100 according to the present exemplary embodiment employs a configuration similar to that of the optical system 100 according to the above exemplary embodiment, and therefore is not redundantly described. The specification values of the optical system 100 correspond to a first numerical value example described below.

The optical system 100 according to the present exemplary embodiment includes a first optical element G1, which includes a refracting region G1T having positive power, a second optical element G2, which includes a refracting region G2T having negative power, and a third optical element G3, which includes a refracting region G3T having positive power. Further, a second reflecting region G2M, which is provided on a reduction-side surface of the second optical element G2, functions as an aperture stop. With this configuration, it is possible to ensure the symmetry of the power arrangement of refracting regions in front of and behind an aperture stop and excellently correct various types of aberration such as magnification chromatic aberration.

Specifically, the first optical element G1 according to the present exemplary embodiment is a positive meniscus lens of which both an enlargement-side surface and a reduction-side surface have convex shapes toward the enlargement side, and is a catadioptric element (a catadioptric lens) having the refracting region G1T and a first reflecting region G1M. The first reflecting region G1M according to the present exemplary embodiment is a front surface mirror provided on the reduction-side surface of the first optical element G1, but may be a back surface mirror provided on the enlargement-side surface of the first optical element G1. However, to obtain the symmetry of the number of times of refraction of light in front of and behind an aperture stop to correct various types of aberration, such as magnification chromatic aberration, it is desirable that the first reflecting region G1M should be a front surface mirror.

The second optical element G2 according to the present exemplary embodiment is a negative meniscus lens of which both an enlargement-side surface and a reduction-side surface have convex shapes toward the enlargement side, and is a catadioptric element having the refracting region G2T and the second reflecting region G2M. Further, the third optical element G3 according to the present exemplary embodiment is a double-convex lens having positive power and is a refractive element (a refractive lens) that does not have a reflecting region. The shapes of the first optical element G1, the second optical element G2, and the third optical element G3 are not limited to those illustrated in FIGS. 1A and 1B, and can be appropriately changed as necessary.

Then, the second reflecting region G2M according to the present exemplary embodiment includes a reflecting portion for reflecting effective light contributing to image formation, and a light-blocking portion for blocking light other than the effective light and functions as an aperture stop. The reflecting portion is composed of a reflective film (an evaporated film), and the light-blocking portion is composed of a light-absorbing member. Alternatively, as described above, the second reflecting region G2M may be provided on an enlargement-side surface of the third optical element G3. In this case, the second optical element G2 is a refractive element, and the third optical element G3 is a catadioptric element.

In a case where the second reflecting region G2M is provided on the enlargement-side surface of the third optical element G3, there is a possibility that aberration occurs when light is emitted from the reduction-side surface of the second optical element G2. Thus, it is desirable to provide the second reflecting region G2M on the reduction-side surface of the second optical element G2 as in the present exemplary embodiment. In a case where the second reflecting region G2M is provided on the enlargement-side surface of the third optical element G3, it is desirable to join the reduction-side surface of the second optical element G2 and the enlargement-side surface of the third optical element G3 or make each surface aspheric, to suppress the occurrence of the above aberration.

Light from a physical body (not illustrated) is incident on the enlargement-side surface of the first optical element G1, passes through the refracting region G1T on the reduction-side surface of the first optical element G1 and the refracting region G2T on the enlargement-side surface of the second optical element G2, and is reflected by the reflecting portion of the second reflecting region G2M. In this case, a part of the light is blocked by the light-blocking portion of the second reflecting region G2M.

The light reflected by the reflecting portion of the second reflecting region G2M passes through the enlargement-side surface of the second optical element G2 and is reflected by the first reflecting region G1M on the reduction-side surface of the first optical element G1. The light reflected by the first reflecting region G1M is incident on the enlargement-side surface of the second optical element G2 again, passes through the refracting region G2T of the second optical element G2 and the refracting region G3T of the third optical element G3, and forms an image plane IMG, which has a planar shape, through an optical block CG. The optical block CG is an optical element corresponding to cover glass or an optical filter and having no power.

As illustrated in FIG. 1B, in an X-direction (a horizontal direction), the optical system 100 has a symmetrical shape with respect to an optical axis A, and light from the enlargement side is incident on the first optical element G1 from both sides with respect to the optical axis A. That is, in a ZX cross section (a horizontal cross section) at each position in a Y-direction, the optical system 100 has a symmetrical shape with respect to the optical axis A. Meanwhile, also in a vertical cross section illustrated in FIG. 1A, the optical system 100 has a symmetrical shape with respect to the optical axis A. However, light from the enlargement side is incident on the first optical element G1 from only a lower side (a −Y side) with respect to the optical axis A, and the image plane IMG is formed on an upper side (a +Y side) with respect to the optical axis A. As described above, the optical system 100 employs a configuration in which in the vertical cross section, light is incident on the first optical element G1 from only one side with respect to the optical axis A, i.e., light is obliquely incident on each optical surface.

At this time, an image capturing apparatus can be configured such that an imaging surface is eccentric in the Y-direction relative to the optical axis A, to receive only a beam incident on the optical system 100 from the opposite side of the imaging surface with respect to the optical axis A. Further, a projection apparatus can be configured such that a display surface is eccentric in the Y-direction relative to the optical axis A, to emit a beam from the display surface, from the opposite side of the display surface with respect to the optical axis A to outside the optical system 100. Consequently, it is possible to downsize the optical system 100 by folding an optical path and also place an image sensor or a display element so as not to interfere with optical elements or optical paths.

The viewing angle in the horizontal cross section including the optical axis A (a horizontal viewing angle) of the optical system 100 according to the present exemplary embodiment is 50°. When a +X side is positive and a −X side is negative using the optical axis A as a reference (0°), the range of an angle $\theta x$ in the horizontal viewing angle is $-25° \leq \theta x \leq +25°$. Further, the viewing angle in the vertical cross section including the optical axis A (a vertical viewing angle) of the optical system 100 is 29°. When the +Y side is positive and the −Y side is negative using, as a reference (0°), a ray (a central ray) reaching a center image height among rays incident on the enlargement-side surface of the first optical element G1, the range of an angle $\theta y$ in the vertical viewing angle is $-14.5° \leq \theta y \leq +14.5°$. The angle between the central ray and the optical axis A is 40°.

In the optical system 100 according to the present exemplary embodiment, the horizontal viewing angle is set symmetrically on both sides with respect to the optical axis A, while the vertical viewing angle is set only on the −Y side with respect to the optical axis A. Then, in the optical system 100, a viewing angle in a vertical cross section (a second cross section) including an optical axis and perpendicular to a horizontal cross section is smaller than a viewing angle in the horizontal cross section (a first cross section) including the optical axis. Further, the optical system 100 according to the present exemplary embodiment is a coaxial system in which the surface vertices and the curvature centers of all the optical surfaces are present on the optical axis A, and is also a rotationally symmetric system in which all the optical surfaces have rotationally symmetric shapes with respect to the optical axis A. The optical system 100 is thus a coaxial system and a rotationally symmetric system, whereby it is possible to excellently correct various types of aberration in each of the horizontal cross section and the vertical cross section.

In the present exemplary embodiment, a medium between the first optical element G1 and the second optical element G2 is a material having a refractive index smaller than that of the second optical element G2. Consequently, on the enlargement-side surface of the second optical element G2, the angle of refraction of light refracted on the lower side with respect to the optical axis A and the angle of refraction of light refracted on the upper side with respect to the optical axis A can be equivalent to each other. Thus, it is possible to excellently correct comatic aberration, magnification chromatic aberration, and distortion.

A region on the lower side with respect to the optical axis A on the enlargement-side surface of the second optical element G2 has a convex shape toward light incident from the enlargement side and therefore refracts light passing through a position distant from the optical axis A more than light passing near the optical axis A. Thus, the angles of beams of light incident on the region on the lower side on the enlargement-side surface of the second optical element G2 are not uniform, and comatic aberration, magnification chromatic aberration, and distortion occur. On the other hand, a region on the upper side with respect to the optical axis A on the enlargement-side surface of the second optical element G2 has a concave shape toward light emitted to the first optical element G1 and therefore refracts light passing through a position distant from the optical axis A more than light passing near the optical axis A.

On optical paths between the region on the lower side and the region on the upper side on the enlargement-side surface of the second optical element G2, the second reflecting region G2M is placed. Thus, the arrangement of rays in a beam (whether the distance from the optical axis A is long or short) is opposite between when the light is incident on the region on the lower side and when the light is emitted from the region on the upper side. Thus, in the region on the upper side on the enlargement-side surface of the second optical element G2, the optical system 100 according to the present exemplary embodiment can cancel comatic aberration, magnification chromatic aberration, and distortion having occurred in the region on the lower side on the enlargement-side surface of the second optical element G2.

In this case, to produce a sufficient refractive index difference between the second optical element G2 and the medium, it is desirable to make the refractive index of the medium as small as possible. Particularly, it is more desirable that the medium should be air as in the present exemplary embodiment. Alternatively, another optical element may be placed between the first optical element G1 and the second optical element G2 as necessary. In this case, however, it is desirable to place a medium having a small refractive index, such as air, between the first optical element G1 and the optical element adjacent to the first optical element G1.

As described above, the second reflecting region G2M according to the present exemplary embodiment is a reflecting surface having a convex shape and also has the function of an aperture stop. The second reflecting region G2M having negative power is thus an aperture stop, whereby it is possible to reduce influence on field curvature or astigmatism and also excellently correct spherical aberration. Further, the second reflecting region G2M has negative power, whereby it is possible to appropriately ensure the distance between the first reflecting region G1M and the image plane IMG, and it is easy to avoid interference between the optical system 100 and an image sensor or a display element. In the present exemplary embodiment, the second reflecting region G2M has such an aspheric surface that the further away from the optical axis A, the smaller the power, whereby it is possible to more excellently correct spherical aberration.

Further, the reflecting portion of the second reflecting region G2M according to the present exemplary embodiment has an elliptical shape. Then, the major axis of the ellipse is parallel to the horizontal cross section, and the minor axis of the ellipse is parallel to the vertical cross section. In other words, the diameter, in a first direction (the horizontal direction) perpendicular to the optical axis A, of the reflecting portion of the second reflecting region G2M is larger than the diameter, in a second direction (the vertical direction) perpendicular to the optical axis A and the first direction, of the reflecting portion. Specifically, the stop value of the optical system 100 according to the present exemplary embodiment is F=1.2 in the horizontal direction (the X-direction) and F=3.0 in the vertical direction (the Y-direction).

That is, the stop value of the optical system 100 according to the present exemplary embodiment is set to be greater (darker) in the vertical cross section, in which the viewing angle of the optical system 100 is asymmetric with respect to the optical axis A, than in the horizontal cross section, in which the viewing angle of the optical system 100 is symmetric with respect to the optical axis A. Consequently, it is possible to improve the brightness and the resolution in the horizontal cross section and also facilitate the avoidance of interference with optical paths by narrowing the beam width in the vertical cross section. Thus, it is possible to improve the degree of freedom in placing optical surfaces. The reflecting portion of the second reflecting region G2M is not limited to an elliptical shape, and may have a rectangular shape as necessary.

The first reflecting region G1M according to the present exemplary embodiment mainly functions to correct field curvature. Generally, to correct field curvature in an optical system, the optical system is designed such that the Petzval sum of optical surfaces are made small by causing positive power and negative power to offset each other, so that a Petzval surface becomes close to flat. In contrast, in the optical system 100 according to the present exemplary embodiment, field curvature is corrected by appropriately setting the sagittal amount of the first reflecting region G1M of the first optical element G1. This is described in detail below.

The optical system 100 according to the present exemplary embodiment has positive power as a whole. Thus, when an image is formed near the image plane IMG, a Petzval surface tends to have such a curved shape that the closer to a peripheral portion from the optical axis A, the more displacement occurs to the enlargement side. Meanwhile, the first reflecting region G1M has a concave shape, i.e., such a shape that the closer to the peripheral portion from the optical axis A, the more displacement occurs to the reduction side. Thus, the closer to the peripheral portion from the optical axis A, the shorter the distance between the first reflecting region G1M and the image plane IMG.

Thus, with the optical path differences between image heights produced by the first reflecting region G1M, it is possible to excellently correct field curvature in the optical system 100. Further, the first reflecting region G1M is an aspheric surface, whereby with an aspheric surface component of the first reflecting region G1M, it is possible to correct field curvature that cannot be sufficiently corrected in a case where the first reflecting region G1M is a spherical surface. Consequently, it is possible to improve the degree of freedom in designing the sagittal amount of the first reflecting region G1M. Thus, it is possible to more excellently correct field curvature.

To correct field curvature in an optical system, generally, an aspheric surface is configured such that power is smaller in a peripheral portion than on an optical axis. On the other hand, in the present exemplary embodiment, unlike a general optical system, field curvature is corrected with the sagittal amount of the first reflecting region G1M. Thus, the aspheric surface amount of the first reflecting region G1M is set such that power is greater in the peripheral portion than on the optical axis A.

In the present exemplary embodiment, with the refracting region G1T and the first reflecting region G1M in the first optical element G1, it is possible to excellently correct aberration as described above. In this case, the refracting region G1T and the first reflecting region G1M are provided in a single optical element, whereby it is possible to suppress an increase in the number of optical elements and the occurrence of an error in the relative placement of optical elements as compared with a case where the refracting region G1T and the first reflecting region G1M are provided in optical elements different from each other. Then, the first optical element G1 is a positive meniscus lens in which a convex surface is directed to the enlargement side, whereby with the refracting region G1T, it is possible to excellently correct magnification chromatic aberration also in a case where the optical system 100 has a wide angle.

As described above, the third optical element G3 according to the present exemplary embodiment has positive power, thereby excellently correcting various types of aberration, such as comatic aberration, occurring in the refracting region G2T on the reduction-side surface of the second optical element G2, which has the second reflecting region G2M that is a convex reflecting surface. At this time, it is desirable that a reduction-side surface of the third optical element G3 should have a concave shape toward the enlargement side as in the present exemplary embodiment. The furthest optical surface placed on the reduction side (the last surface) in the optical system 100 is a refracting surface having a concave shape toward the enlargement side, whereby it is possible to excellently correct field curvature or astigmatism that cannot be sufficiently corrected by other optical surfaces. Alternatively, the reduction-side surface of the third optical element G3 may have a convex shape toward the enlargement side as necessary. In this case, however, it is desirable to further place a refracting surface having a concave shape toward the enlargement side, further on the reduction side than the third optical element G3.

It is desirable that the following conditional expression (1) should be satisfied where the total of the thicknesses of optical elements present between the first reflecting region G1M and the second reflecting region G2M is Lg, and the distance between an optical surface including the first reflecting region G1M and an optical surface including the second reflecting region G2M is Lm. In this case, a thickness indicates a thickness on the optical axis A. In the present exemplary embodiment, the thickness of the second optical element G2 is Lg, and the distance between the reduction-side surface of the first optical element G1 and the reduction-side surface of the second optical element G2 is Lm.

$$0.3 \leq Lg/Lm \leq 0.95 \quad (1)$$

If Lg/Lm falls below the lower limit of the conditional expression (1), light is refracted in a portion near the optical axis A on a refracting surface present between the first reflecting region G1M and the second reflecting region G2M. Thus, it is difficult to excellently correct magnification chromatic aberration. Further, if Lg/Lm exceeds the upper limit of the conditional expression (1), the distance between optical surfaces present between the first reflecting region G1M and the second reflecting region G2M becomes too small. Thus, it is not possible to sufficiently refract light, and it is difficult to excellently correct magnification chromatic aberration. Further, it is more desirable that the following conditional expression (1a) should be satisfied.

$$0.32 \leq Lg/Lm \leq 0.90 \quad (1a)$$

Further, it is desirable that the following conditional expression (2) should be satisfied where the radius of curvature of the optical surface including the first reflecting region G1M is Rp, and the radius of curvature of the optical surface including the second reflecting region G2M is Rn. In the present exemplary embodiment, the radius of curvature of the reduction-side surface of the first optical element G1 is Rp, and the radius of curvature of the reduction-side surface of the second optical element G2 is Rn.

$$0.7 \leq Rp/Rn \leq 1.3 \quad (2)$$

In the optical system 100 according to the present exemplary embodiment, to suppress the occurrence of chromatic aberration, the first reflecting region G1M and the second reflecting region G2M have relatively great power. Thus, the conditional expression (2) is satisfied, whereby it is possible to make the Petzval sum of the optical system 100 small to suppress the occurrence of field curvature. If Rp/Rn falls outside the range of the conditional expression (2), the Petzval sum of the optical system 100 becomes great. Thus, it is difficult to sufficiently suppress the occurrence of field curvature. Further, it is more desirable that the following conditional expression (2a) should be satisfied.

$$0.75 \leq Rp/Rn \leq 1.2 \quad (2a)$$

Further, it is desirable that the following conditional expression (3) should be satisfied where the radius of curvature of a closest refracting surface, that is closest to the first optical element G1 among refracting surfaces located on the reduction side of the first optical element G1, is R1, and the distance between the closest refracting surface and the optical surface including the second reflecting region G2M is L1. In the present exemplary embodiment, the radius of curvature of the enlargement-side surface of the second optical element G2 (e.g. the closest refracting surface) is R1, and the distance between the enlargement-side surface and the reduction-side surface of the second optical element G2 is L1.

$$2.0 \leq R1/L1 \leq 5.5 \quad (3)$$

If R1/L1 falls below the lower limit of the conditional expression (3), the incident angle of an off-axis beam on the closest refracting surface to the first optical element G1 further on the reduction side than the first optical element G1 becomes too small, and the principal ray of the off-axis beam is not sufficiently refracted. Thus, it is necessary to make the first optical element G1 large when the optical system 100 has a wide angle, and therefore, it is difficult to downsize the entire system. Further, if R1/L1 exceeds the upper limit of the conditional expression (3), the incident angle of the off-axis beam on the closest refracting surface to the first optical element G1 further on the reduction side than the first optical element G1 becomes too great. Thus, it is difficult to excellently correct magnification chromatic aberration or astigmatism. Further, it is more desirable that the following conditional expression (3a) should be satisfied.

$$2.5 \leq R1/L1 \leq 5.0 \quad (3a)$$

Table 1 below illustrates the values of the conditional expressions regarding the optical system 100 according to the present exemplary embodiment. As illustrated in table 1, the optical system 100 satisfies all the above conditional expressions.

FIG. 2 is a lateral aberration diagram of the optical system 100 according to the present exemplary embodiment. FIG. 2 illustrates lateral aberration at each of the C-line (a wavelength of 656.3 nm), the d-line (a wavelength of 587.6 nm), the F-line (a wavelength of 486.1 nm), and the g-line (a wavelength of 435.8 nm) at five viewing angles of the optical system 100. The unit of the numerical value of the lateral aberration is mm. As can be seen from FIG. 2, comatic aberration and magnification chromatic aberration are excellently corrected. Further, the aperture ratio (vignetting) of the optical system 100 is 100% at all the viewing angles, and therefore, mechanical vignetting does not occur due to the second reflecting region G2M. Thus, an optical system that is bright from an on-axis portion to an off-axis portion is achieved.

As described above, based on the optical system 100 according to the present exemplary embodiment, it is possible to achieve an optical system that is small-sized but has high image forming performance.

An optical system 200 according to a second exemplary embodiment of the present invention is described below. In the optical system 200 according to the present exemplary embodiment, components equivalent to those of the optical system 100 according to the first exemplary embodiment are not described here. The specification values of the optical system 200 correspond to a second numerical value example described below.

Figure 3A:
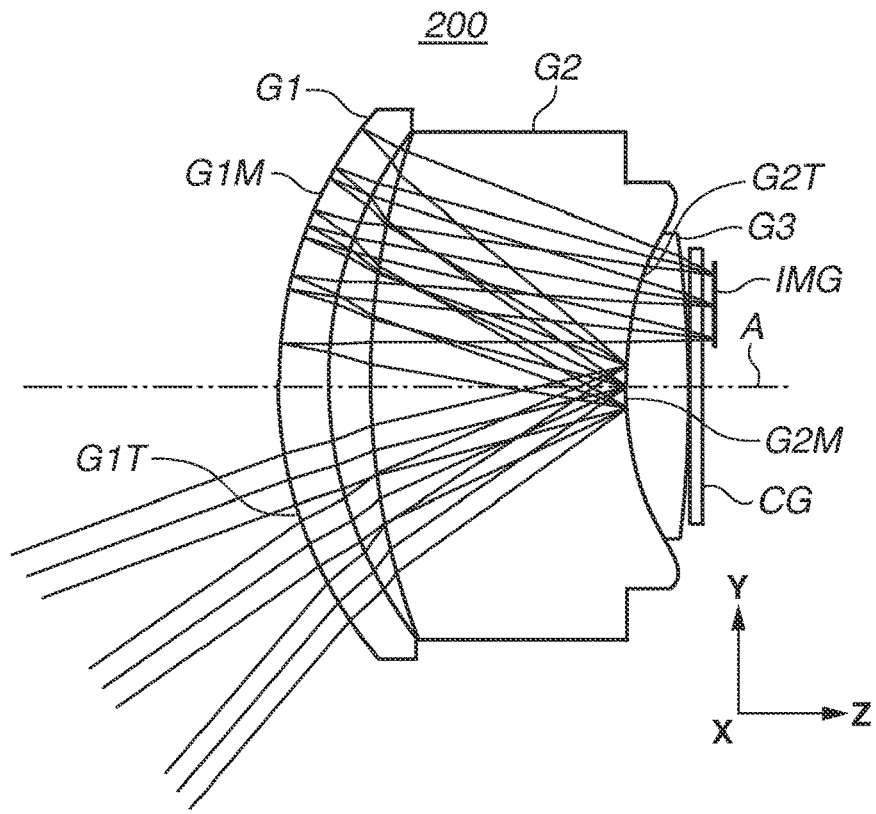
FIG. 3A is a schematic diagram of a main part of an optical system according to a second exemplary embodiment of the present invention (a YZ cross section).
Figure 3B:
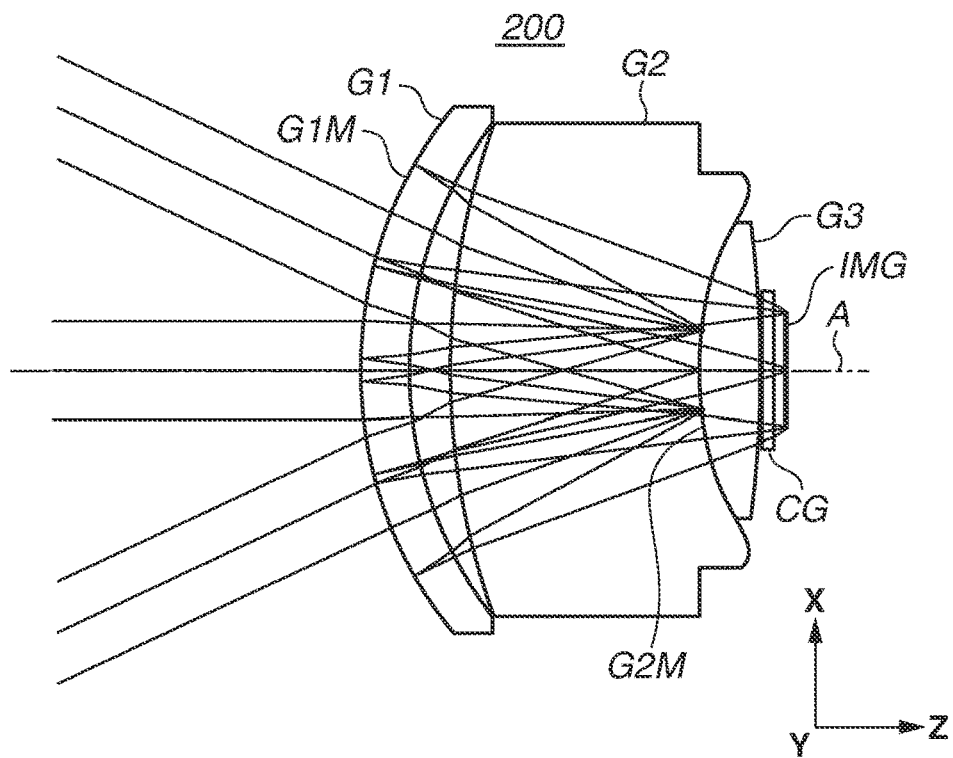
FIG. 3B is a schematic diagram of the main part of the optical system according to the second exemplary embodiment of the present invention (as viewed from a +Y side).

FIG. 3A is a schematic diagram of a main part of the optical system 200 according to the present exemplary embodiment, along a YZ cross section including an optical axis A. FIG. 3B is a schematic diagram of the main part of the optical system 200 as viewed from a +Y side in a Y-direction. The optical system 200 according to the present exemplary embodiment is different from the optical system 100 according to the first exemplary embodiment in that the first reflecting region G1M is provided on the enlargement-side surface of the first optical element G1, the second optical element G2 and the third optical element G3 are joined together, and the second reflecting region G2M is provided on this joint surface.

The first reflecting region G1M is a back surface mirror in the present exemplary embodiment, whereby it is possible to reduce deterioration due to the peeling of a reflective film (an evaporated film) or environmental fluctuation, and improve resistance to environment. Further, the second optical element G2 and the third optical element G3 are joined together in the present exemplary embodiment, whereby it is possible to suppress the occurrence of total reflection or aberration at the interface between optical elements, and a decrease in the image forming performance due to the relative positional shift of optical elements.

In the optical system 200 according to the present exemplary embodiment, the horizontal viewing angle is 50°, the vertical viewing angle is 29°, the angle between the central ray and the optical axis A in the horizontal cross section is 35°, the stop value in the horizontal direction is 1.4, and the stop value in the vertical direction is 2.7. Further, as illustrated in table 1 below, the optical system 200 satisfies all the above conditional expressions.

Figure 4:
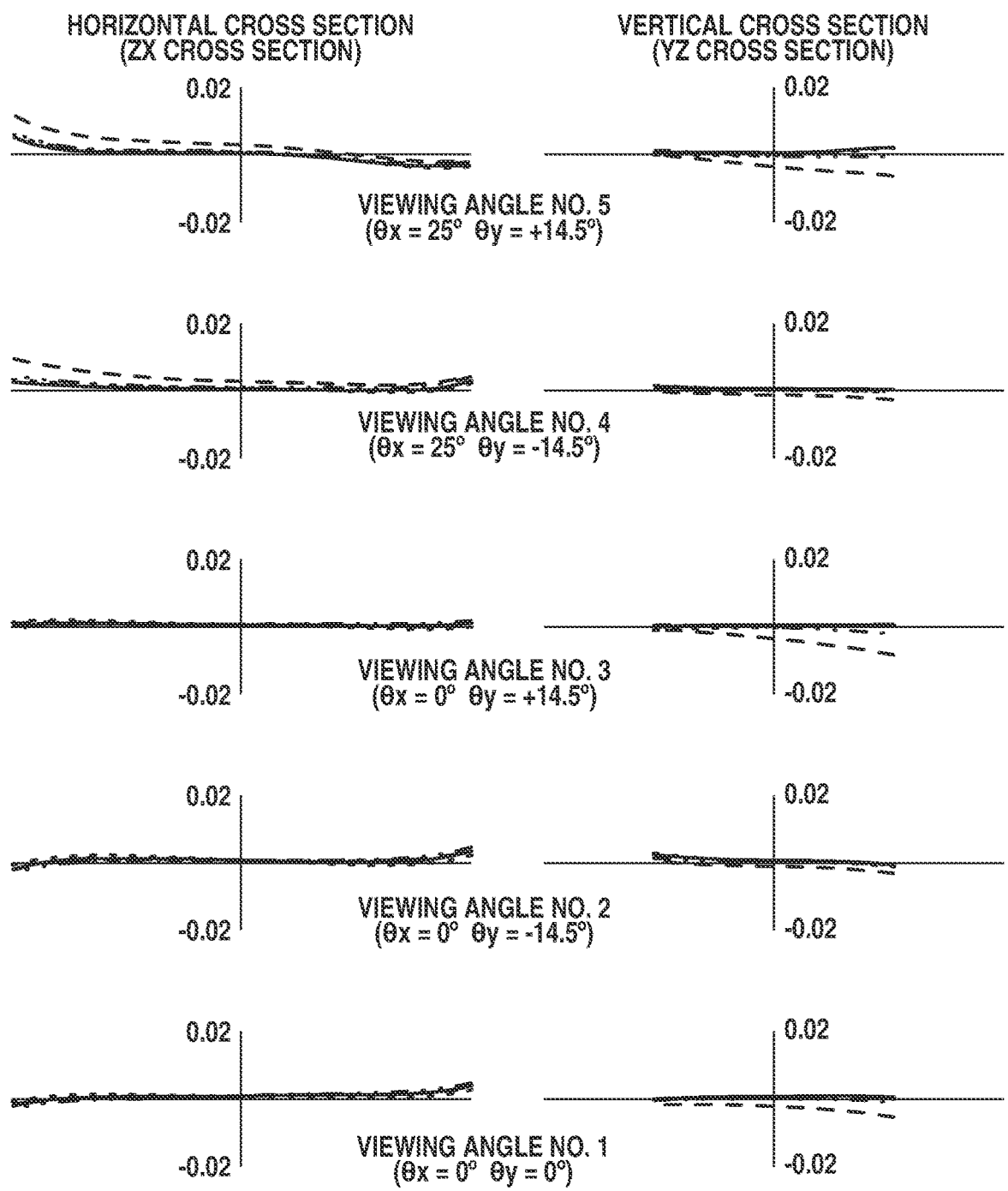
FIG. 4 is a lateral aberration diagram of the optical system according to the second exemplary embodiment.

FIG. 4 is a lateral aberration diagram of the optical system 200 according to the present exemplary embodiment. As can be seen from FIG. 4, comatic aberration and magnification chromatic aberration are excellently corrected. Further, the aperture ratio of the optical system 200 is 100% at all the viewing angles. Thus, an optical system that is bright from an on-axis portion to an off-axis portion is achieved.

An optical system 300 according to a third exemplary embodiment of the present invention is described below. In the optical system 300 according to the present exemplary embodiment, components equivalent to those of the optical system 100 according to the first exemplary embodiment are not described here. The specification values of the optical system 300 correspond to a third numerical value example described below.

Figure 5A:
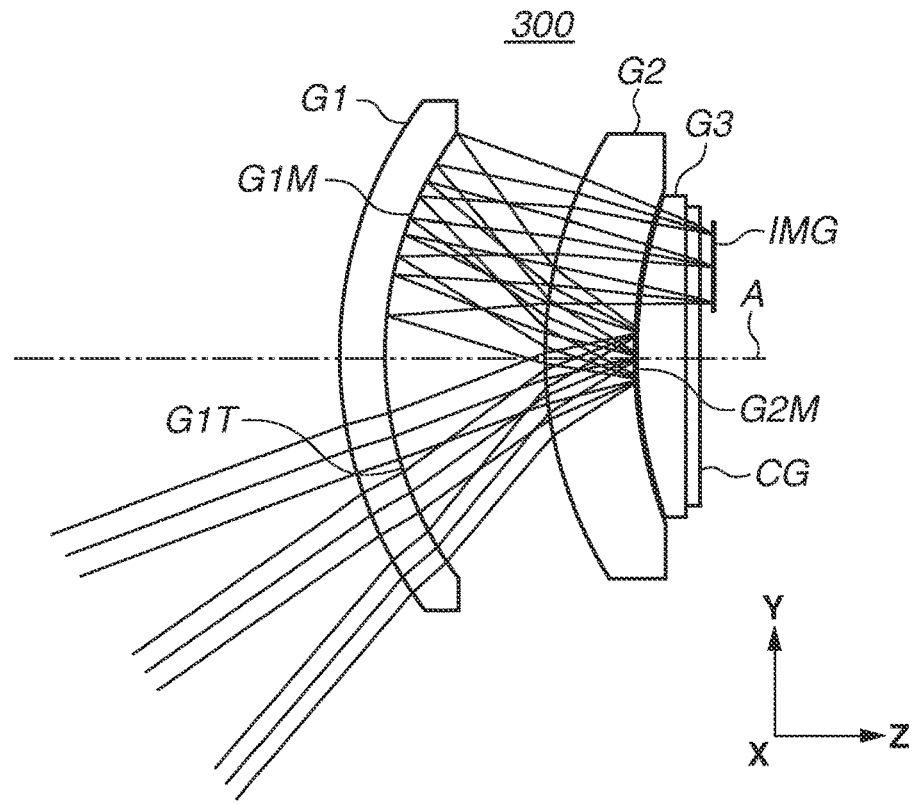
FIG. 5A is a schematic diagram of a main part of an optical system according to a third exemplary embodiment of the present invention (a YZ cross section).
Figure 5B:
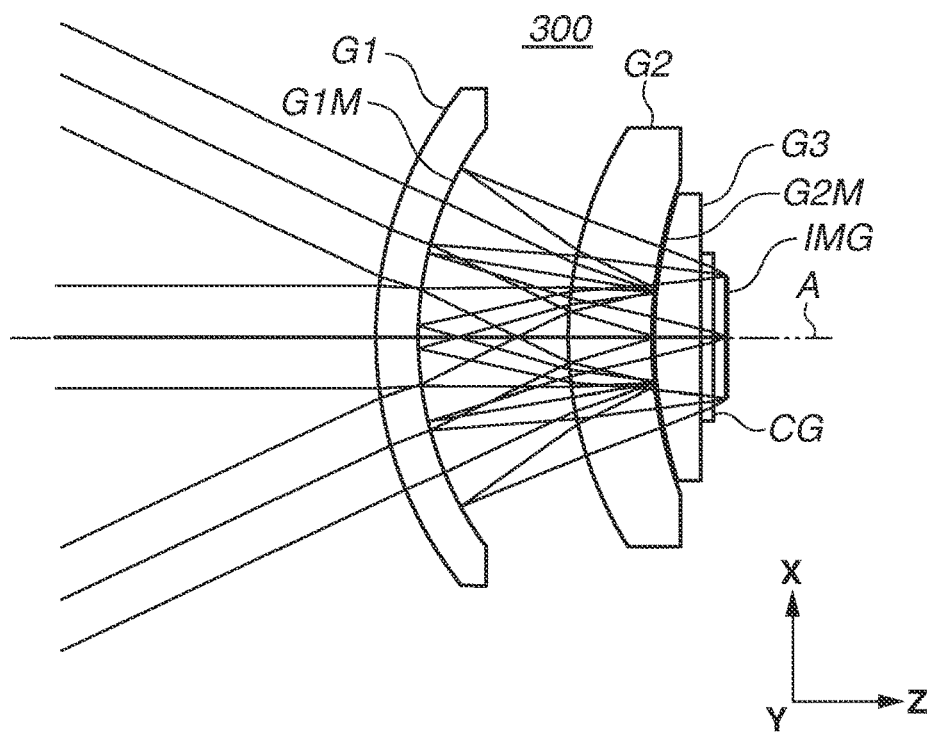
FIG. 5B is a schematic diagram of the main part of the optical system according to the third exemplary embodiment of the present invention (as viewed from a +Y side).

FIG. 5A is a schematic diagram of a main part of the optical system 300 according to the present exemplary embodiment, along a YZ cross section including an optical axis A. FIG. 5B is a schematic diagram of the main part of the optical system 300 as viewed from a +Y side in a Y-direction. The optical system 300 according to the present exemplary embodiment is different from the optical system 100 according to the first exemplary embodiment in that the second reflecting region G2M is provided on the enlargement-side surface of the third optical element G3.

In the optical system 300 according to the present exemplary embodiment, the horizontal viewing angle is 50°, the vertical viewing angle is 29°, the angle between the central ray and the optical axis A in the horizontal cross section is 35°, the stop value in the horizontal direction is 1.4, and the stop value in the vertical direction is 3.1. Further, as illustrated in table 1 below, the optical system 300 satisfies all the above conditional expressions.

Figure 6:
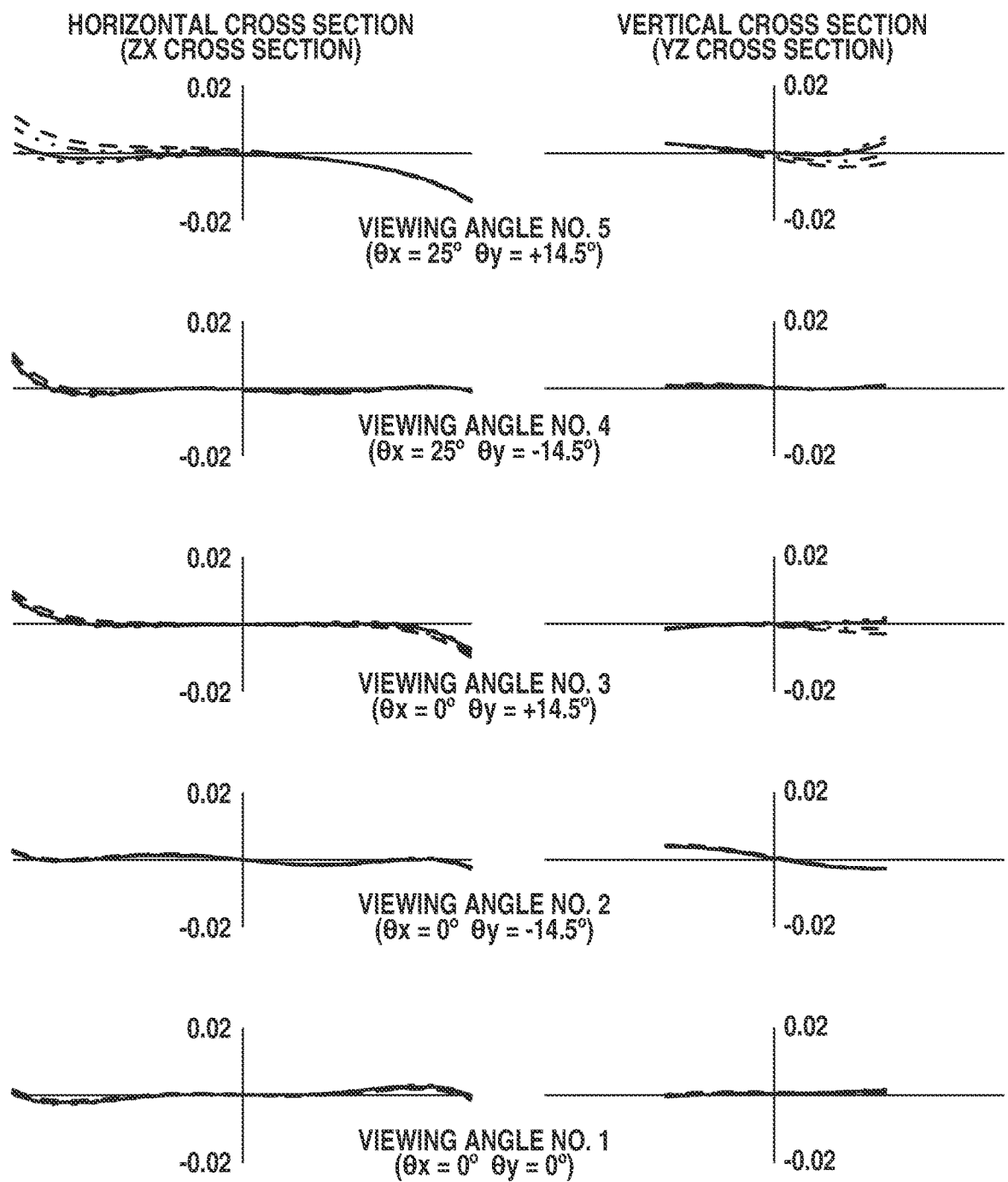
FIG. 6 is a lateral aberration diagram of the optical system according to the third exemplary embodiment.

FIG. 6 is a lateral aberration diagram of the optical system 300 according to the present exemplary embodiment. As can be seen from FIG. 6, comatic aberration and magnification chromatic aberration are excellently corrected. Further, the aperture ratio of the optical system 300 is 100% at all the viewing angles. Thus, an optical system that is bright from an on-axis portion to an off-axis portion is achieved.

An optical system 400 according to a fourth exemplary embodiment of the present invention is described below. In the optical system 400 according to the present exemplary embodiment, components equivalent to those of the optical system 100 according to the first exemplary embodiment are not described here. The specification values of the optical system 400 correspond to a fourth numerical value example described below.

Figure 7A:
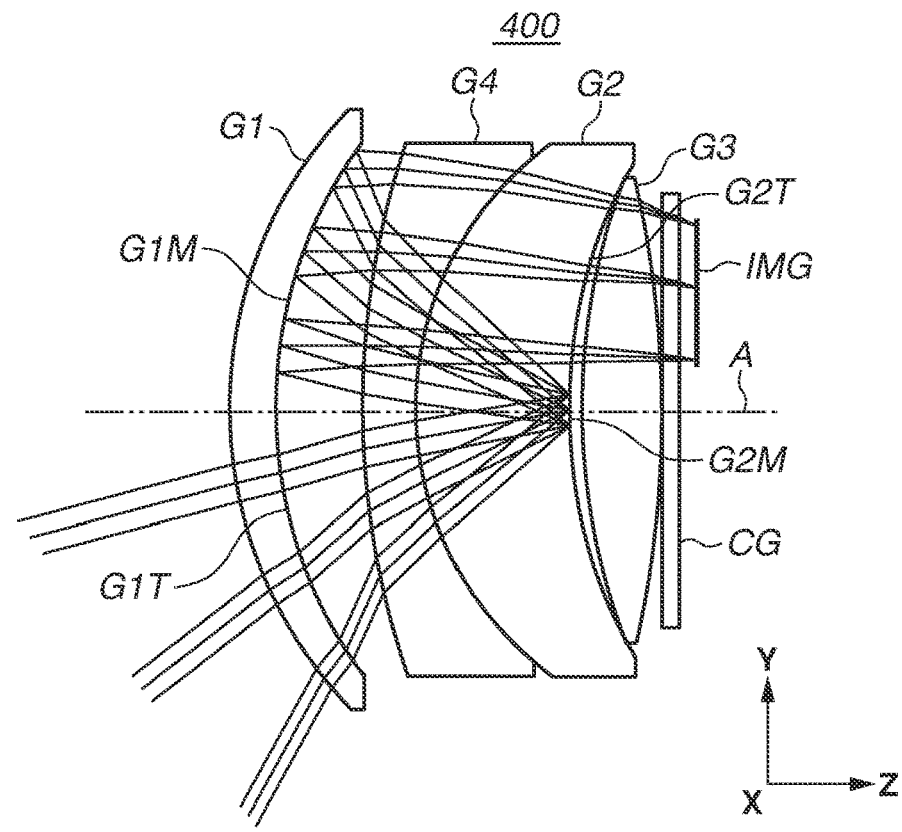
FIG. 7A is a schematic diagram of a main part of an optical system according to a fourth exemplary embodiment of the present invention (a YZ cross section).
Figure 7B:
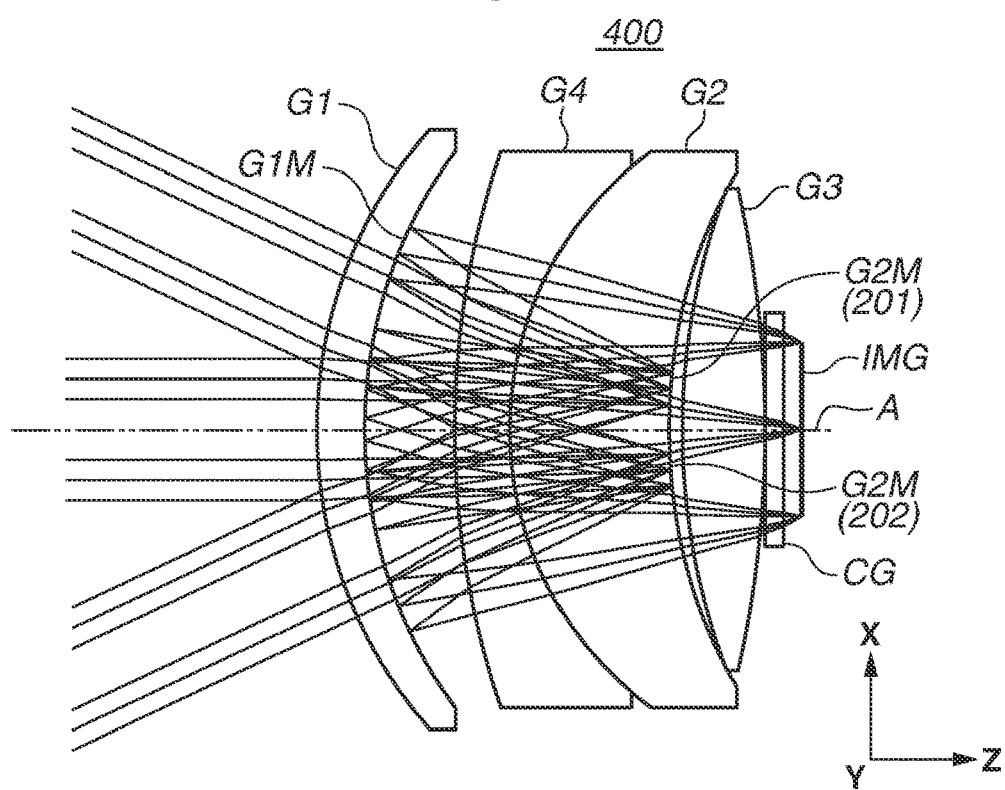
FIG. 7B is a schematic diagram of the main part of the optical system according to the fourth exemplary embodiment of the present invention (as viewed from a +Y side).

FIG. 7A is a schematic diagram of a main part of the optical system 400 according to the present exemplary embodiment, along a YZ cross section including an optical axis A. FIG. 7B is a schematic diagram of the main part of the optical system 400 as viewed from a +Y side in a Y-direction. The optical system 400 according to the present exemplary embodiment is different from the optical system 100 according to the first exemplary embodiment in that a fourth optical element G4 is placed between the first optical element G1 and the second optical element G2, and two reflecting portions are provided in the second reflecting region G2M. As illustrated in FIG. 7B, the optical system 400 employs a configuration in which the pupil is divided into two parts in the horizontal cross section by the two reflecting portions. Consequently, the optical system 400 can be used as a distance measuring optical system.

Figure 8:
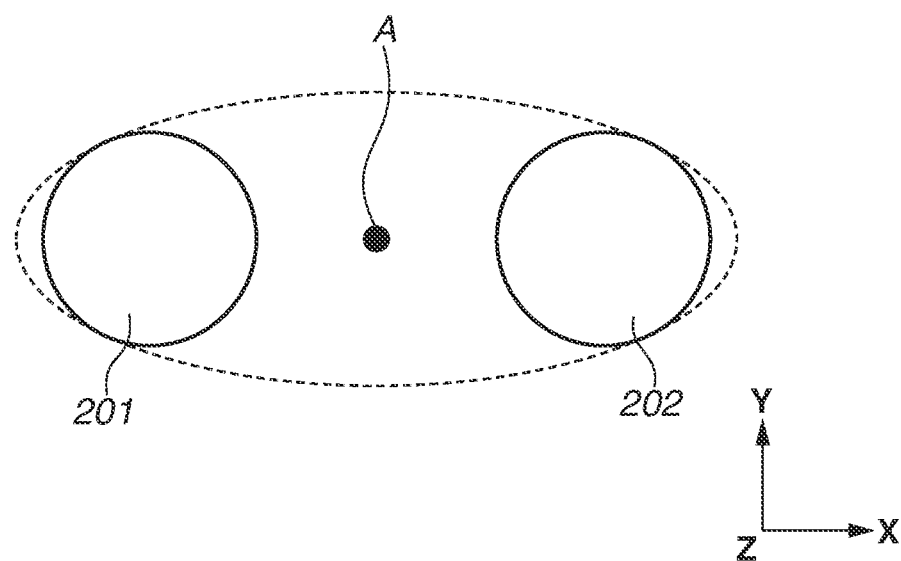
FIG. 8 is a schematic diagram of main parts of reflecting portions in the optical system according to the fourth exemplary embodiment.

FIG. 8 is a schematic diagram of main parts of the reflecting portions of the second reflecting region G2M as viewed from a −Z side in a Z-direction in the optical system 400. In FIG. 8, solid lines indicate the reflecting portions of the second reflecting region G2M, and a dotted line indicates an effective region corresponding to a portion where aberration in the optical system 400 is sufficiently corrected, and high image forming performance is obtained. In other words, the dotted line in FIG. 8 indicates a reflecting portion when it is assumed that the optical system 400 is used not as a distance measuring optical system but as a normal image capturing optical system similarly to the first exemplary embodiment.

As illustrated in FIG. 8, in the second reflecting region G2M of the optical system 400, two reflecting portions 201 and 202, which are eccentric in the X-direction with respect to the optical axis A, are provided. Based on the two reflecting portions 201 and 202, it is possible to divide the pupil of the optical system 400 in the horizontal cross section. The reflecting portions 201 and 202 are each formed of a reflective film similarly to the first exemplary embodiment.

In a case where the optical system 400 is used as a distance measuring optical system, an image sensor capable of photoelectrically converting in a distinguished manner an image of an object formed by a beam reflected by the reflecting portion 201 and an image of an object formed by a beam reflected by the reflecting portion 202 is placed on the image plane IMG of the optical system 400. Such an image sensor, the optical system 400, and a processing unit described below can form a distance measuring apparatus such as an in-vehicle camera.

When an object is present on the focal plane of the optical system 400, positional shifts do not occur in images of the two divided beams on the image plane IMG of the optical system 400. However, when an object is present at a position other than the focal plane of the optical system 400, positional shifts occur in images of the two divided beams. In this case, the positional shift of the images formed by the respective beams corresponds to the amount of displacement of the object from the focal plane. Thus, the amount of positional shift of the images of the respective beams and the direction of the positional shift are acquired, whereby it is possible to measure the distance from the object.

In the optical system 400, the two reflecting portions are eccentric in the X-direction. Alternatively, the two reflecting portions can be eccentric in the Y-direction as necessary. To improve the accuracy of distance measurement, however, it is desirable that the two reflecting portions should be eccentric in the X-direction. This is because in the effective region indicated by the dotted line in FIG. 8, the stop value in the horizontal direction, which is symmetric with respect to the optical axis A, is smaller than the stop value in the vertical direction, which is asymmetric with respect to the optical axis A.

In the optical system 400 according to the present exemplary embodiment, the horizontal viewing angle is 50°, the vertical viewing angle is 46°, and the angle between the central ray and the optical axis A in the horizontal cross section is 38°. Further, the stop values of the effective region of the second reflecting region G2M, which is indicated by the dotted line in FIG. 8, are 1.5 in the horizontal direction and 5.3 in the vertical direction. Then, as illustrated in table 1 below, the optical system 400 satisfies all the above conditional expressions.

Figure 9:
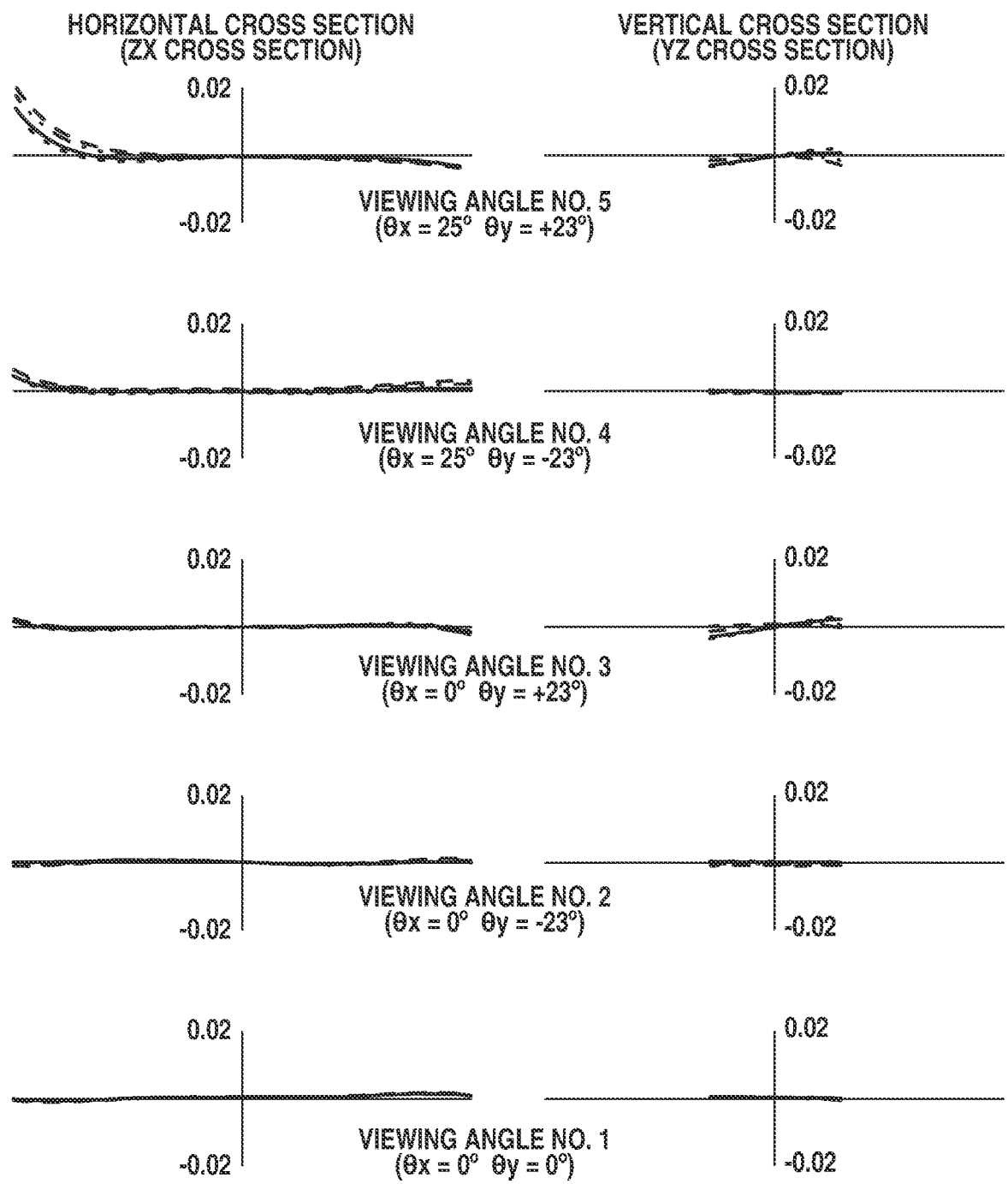
FIG. 9 is a lateral aberration diagram of the optical system according to the fourth exemplary embodiment.

FIG. 9 is a lateral aberration diagram of the optical system 400 according to the present exemplary embodiment. As can be seen from FIG. 9, comatic aberration and magnification chromatic aberration are excellently corrected. Further, the aperture ratio of the optical system 400 is 100% at all the viewing angles. Thus, an optical system that is bright from an on-axis portion to an off-axis portion is achieved. An optical system that is small-sized but has high image forming performance is thus applied to a distance measuring apparatus, whereby it is possible to downsize the whole apparatus and achieve high accuracy of distance measurement.

Alternatively, the optical system 400 according to the present exemplary embodiment may be used as an image capturing optical system similar to the optical systems according to the first to third exemplary embodiments by providing a reflective film in the entirety of the effective region indicated by the dotted line in FIG. 8. Also in this case, effects similar to those of the first to third exemplary embodiments can be obtained. Further, each of the optical systems according to the first to third exemplary embodiments may be used as a distance measuring optical system similarly to the optical system 400 according to the present exemplary embodiment. In this case, similarly to the optical system 400, the pupil may be able to be divided by providing two reflecting portions in the second reflecting region G2M of each of the optical systems according to the first to third exemplary embodiments.

NUMERICAL VALUE EXAMPLES

First to fourth numerical value examples corresponding to the optical systems according to the first to fourth exemplary embodiments are illustrated below.

In each of the numerical value examples, a surface number represents the number (i) of an optical surface counted from the enlargement side, r represents the radius of curvature (mm) of an i-th optical surface (an i-th surface), and d represents the distance (mm) between the i-th surface and an (i+1)-th surface. Nd and νd represent the refractive index and the Abbe number, respectively, at the d-line of a medium between the i-th surface and the (i+1)-th surface. Further, Fno represents the stop value, and the unit of the focal length is mm. The surface distance d is positive when the direction is toward the reduction side along an optical path, and is negative when the direction is toward the enlargement side along an optical path. "E±N" means "$\times 10^{\pm N}$".

In each of the numerical value examples, an optical surface having a surface number with "*" on its side is an aspheric surface. In each of the numerical value examples,

TABLE 1

|  |  | First exemplary embodiment | Second exemplary embodiment | Third exemplary embodiment | Fourth exemplary embodiment |
| --- | --- | --- | --- | --- | --- |
| Conditional expression (1) | Lm | 11.1 | 27.7 | 18.2 | 16.5 |
|  | Lg | 7.97 | 24.4 | 6.44 | 11.6 |
|  | Lg/Lm | 0.718 | 0.881 | 0.354 | 0.703 |
| Conditional expression (2) | Rp | 23.0 | 34.3 | 27.6 | 25.9 |
|  | Rn | 29.4 | 31.1 | 34.7 | 30.7 |
|  | Rp/Rn | 0.782 | 1.10 | 0.795 | 0.844 |
| Conditional expression (3) | R1 | 37.2 | 57.4 | 30.1 | 46.1 |
|  | L1 | 7.97 | 20.4 | 6.63 | 11.6 |
|  | R1/L1 | 4.67 | 2.81 | 4.54 | 3.97 | each optical surface having an aspheric surface shape has a rotationally symmetric shape with respect to the optical axis A and is represented by the following aspheric surface expression.

$$z = \frac{ch^2}{1 + \sqrt{1 - (1+k)c^2 h^2}} + Ah^4 + Bh^6 + Ch^8 + Dh^{10} \quad (1)$$

In this aspheric surface expression, z represents the sagittal amount (mm) in the optical axis direction of the aspheric surface shape, c represents the curvature (1/mm) on the optical axis A, k represents a conical constant (a conic constant), h represents the distance (mm) in the radial direction from the optical axis A, and A to D represent fourth to tenth-order term aspheric coefficients. In the above aspheric surface expression, the first term represents the sagittal amount of a reference spherical surface, and the radius of curvature of the reference spherical surface is r=1/c. Further, the second term and terms thereafter each represent the sagittal amount (the aspheric surface amount) of an aspheric surface component given on the reference spherical surface. In the present exemplary embodiment, fourth to tenth-order term aspheric coefficients are used. Alternatively, a twelfth or higher order term aspheric coefficient can be used. In each of the numerical value examples, in a case where an optical surface has an aspheric surface shape, the radius of curvature of the reference spherical surface is the radius of curvature of the optical surface, and the radius of curvature of the optical surface satisfies the above conditional expressions.

First Numerical Value Example

| Surface number | r | d | Nd | vd |
|---|---|---|---|---|
| 1 | 22.61 | 3.31 | 1.847 | 23.8 |
| 2* | 22.99 | 3.15 | | |
| 3 | 37.27 | 7.97 | 1.487 | 70.2 |
| 4* | 29.37 | −7.97 | 1.487 | 70.2 |
| 5 | 37.27 | −3.15 | | |
| 6* | 22.99 | 3.15 | | |
| 7 | 37.27 | 7.97 | 1.487 | 70.2 |
| 8* | 29.37 | 0.15 | | |
| 9 | 24.44 | 9.16 | 1.642 | 58.4 |
| 10 | −43.13 | 0.89 | | |
| 11 | ∞ | 1.00 | 1.516 | 64.1 |
| 12 | ∞ | 1.00 | | |

Aspheric Coefficient

| Surface number | K | A | B | C | D |
|---|---|---|---|---|---|
| 2, 6 | 0.000E+00 | 2.874E−06 | −2.575E−09 | 5.243E−11 | −9.892E−14 |
| 4, 8 | 0.000E+00 | 1.797E−05 | −7.547E−08 | 6.649E−10 | −2.000E−12 |

Various Types of Data

| | |
|---|---|
| Focal length | 10.8 |
| Fno (horizontal direction) | 1.2 |
| Fno (vertical direction) | 3.0 |
| Viewing angle (horizontal direction) | ±25° |
| Viewing angle (vertical direction) | ±14.5° |

Second Numerical Value Example

| Surface number | r | d | Nd | vd |
|---|---|---|---|---|
| 1* | 34.29 | 4.00 | 1.847 | 23.8 |
| 2 | 32.81 | 3.34 | | |
| 3 | 57.44 | 20.37 | 1.772 | 49.6 |
| 4* | 31.10 | −20.37 | 1.772 | 49.6 |
| 5 | 57.44 | −3.34 | | |
| 6 | 32.81 | −4.00 | 1.847 | 23.8 |
| 7* | 34.29 | 4.00 | 1.847 | 23.8 |
| 8 | 32.81 | 3.34 | | |
| 9 | 57.44 | 20.37 | 1.772 | 49.6 |
| 10* | 31.10 | 5.00 | 1.487 | 70.2 |
| 11 | −91.58 | 0.09 | | |
| 12 | ∞ | 1.00 | 1.517 | 64.2 |
| 13 | ∞ | 1.00 | | |

-continued

Aspheric Coefficient

| Surface number | K | A | B | C | D |
|---|---|---|---|---|---|
| 1, 7 | 0.000E+00 | 4.063E−07 | 7.541E−10 | −2.563E−13 | 1.379E−15 |
| 4, 10 | 0.000E+00 | 1.316E−05 | 1.835E−07 | 4.693E−11 | −4.645E−12 |

Various Types of Data

| | |
|---|---|
| Focal length | 10.7 |
| Fno (horizontal direction) | 1.4 |
| Fno (vertical direction) | 2.7 |
| Viewing angle (horizontal direction) | ±25° |
| Viewing angle (vertical direction) | ±14.5° |

Third Numerical Value Example

Surface Data

| Surface number | r | d | Nd | vd |
|---|---|---|---|---|
| 1 | 30.61 | 3.28 | 1.847 | 23.8 |
| 2* | 27.62 | 11.54 | | |
| 3 | 30.12 | 6.44 | 1.678 | 55.3 |
| 4 | 33.56 | 0.19 | | |
| 5* | 34.70 | −0.19 | | |
| 6 | 33.56 | −6.44 | 1.678 | 55.3 |
| 7 | 30.12 | −11.54 | | |
| 8* | 27.62 | 11.54 | | |
| 9 | 30.12 | 6.44 | 1.678 | 55.3 |
| 10 | 33.56 | 0.19 | | |
| 11* | 34.70 | 3.57 | 1.487 | 70.2 |
| 12 | 1171.67 | 0.00 | | |
| 13 | ∞ | 1.00 | 1.517 | 64.2 |
| 14 | ∞ | 1.00 | | |

Aspheric Coefficient

| Surface number | K | A | B | C | D |
|---|---|---|---|---|---|
| 2, 8 | 0.000E+00 | 1.166E−06 | 1.600E−09 | 2.132E−12 | −9.631E−15 |
| 5, 11 | 0.000E+00 | 2.304E−05 | −3.509E−07 | 2.323E−09 | −7.688E−12 |

Various Types of Data

| | |
|---|---|
| Focal length | 11 |
| Fno (horizontal direction) | 1.4 |
| Fno (vertical direction) | 3.1 |
| Viewing angle (horizontal direction) | ±25° |
| Viewing angle (vertical direction) | ±14.5° |

Fourth Numerical Value Example

Surface Data

| Surface number | r | d | Nd | vd |
|---|---|---|---|---|
| 1 | 24.35 | 2.61 | 1.652 | 58.6 |
| 2* | 25.92 | 4.89 | | |
| 3 | 46.14 | 3.00 | 1.541 | 47.2 |
| 4 | 18.52 | 8.64 | 1.757 | 47.8 |
| 5* | 30.72 | −8.64 | 1.757 | 47.8 |
| 6 | 18.52 | −3.00 | 1.541 | 47.2 |
| 7 | 46.14 | −4.89 | | |
| 8* | 25.92 | 4.89 | | |
| 9 | 46.14 | 3.00 | 1.541 | 47.2 |
| 10 | 18.52 | 8.64 | 1.757 | 47.8 |
| 11* | 30.72 | 0.71 | | |

-continued

| | | | | |
|---|---|---|---|---|
| 12 | 36.16 | 4.50 | 1.652 | 58.6 |
| 13 | −58.25 | 0.00 | | |
| 14 | ∞ | 1.00 | 1.517 | 64.2 |
| 15 | ∞ | 1.00 | | |

Aspheric Coefficient

| Surface number | K | A | B | C | D |
|---|---|---|---|---|---|
| 2, 8 | 0.000E+00 | 1.936E−06 | 1.954E−09 | 1.044E−11 | −8.875E−15 |
| 5, 11 | 0.000E+00 | 1.368E−05 | −7.957E−08 | 6.694E−10 | −1.928E−12 |

Various Types of Data

| | |
|---|---|
| Focal length | 10.9 |
| Fno (horizontal direction) | 1.5 |
| Fno (vertical direction) | 5.3 |
| Viewing angle (horizontal direction) | ±25° |
| Viewing angle (vertical direction) | ±23° |

[In-Vehicle Camera System]

Figure 10:
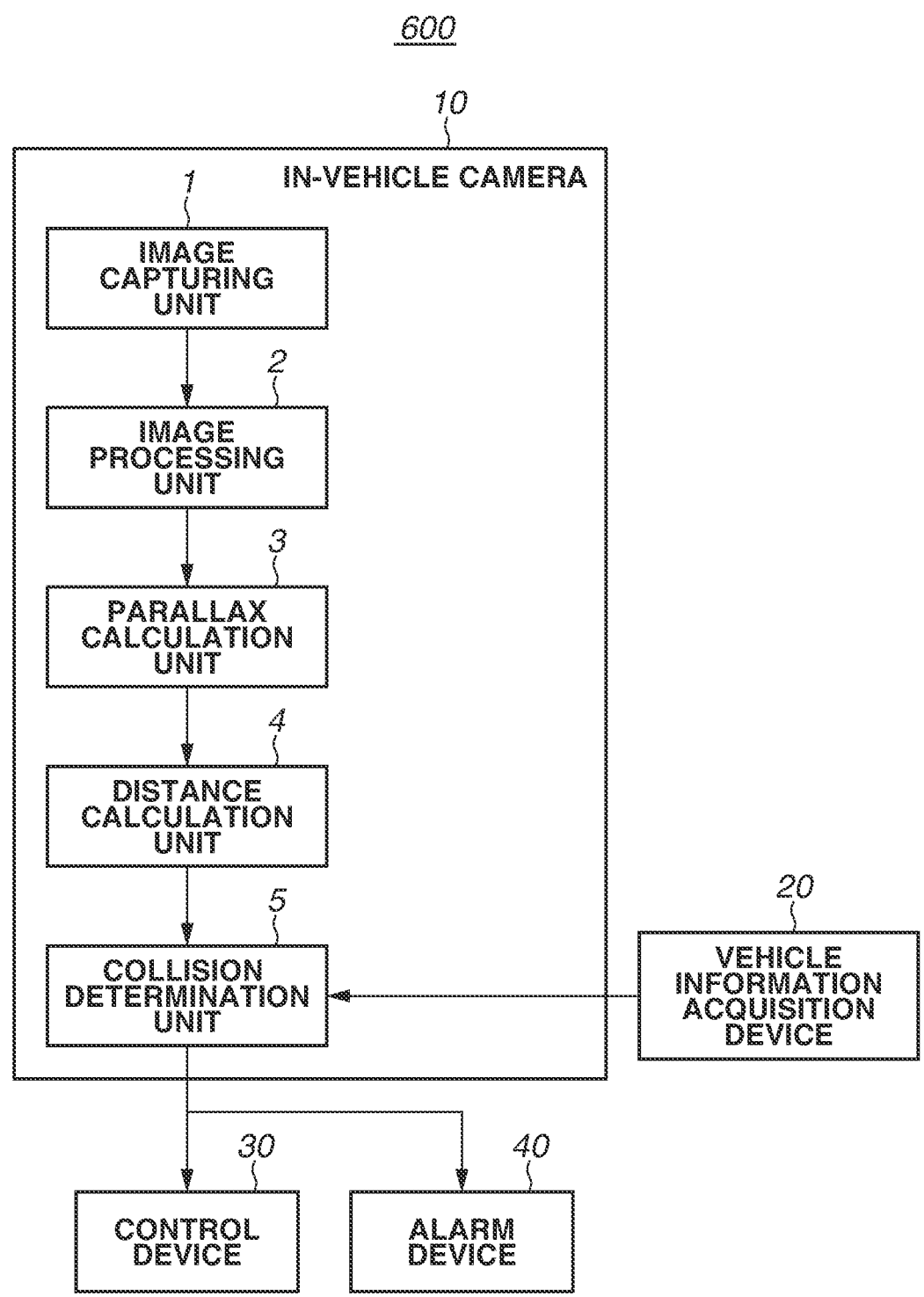
FIG. 10 is a functional block diagram of an in-vehicle camera system according to an exemplary embodiment of the present invention.
Figure 11:
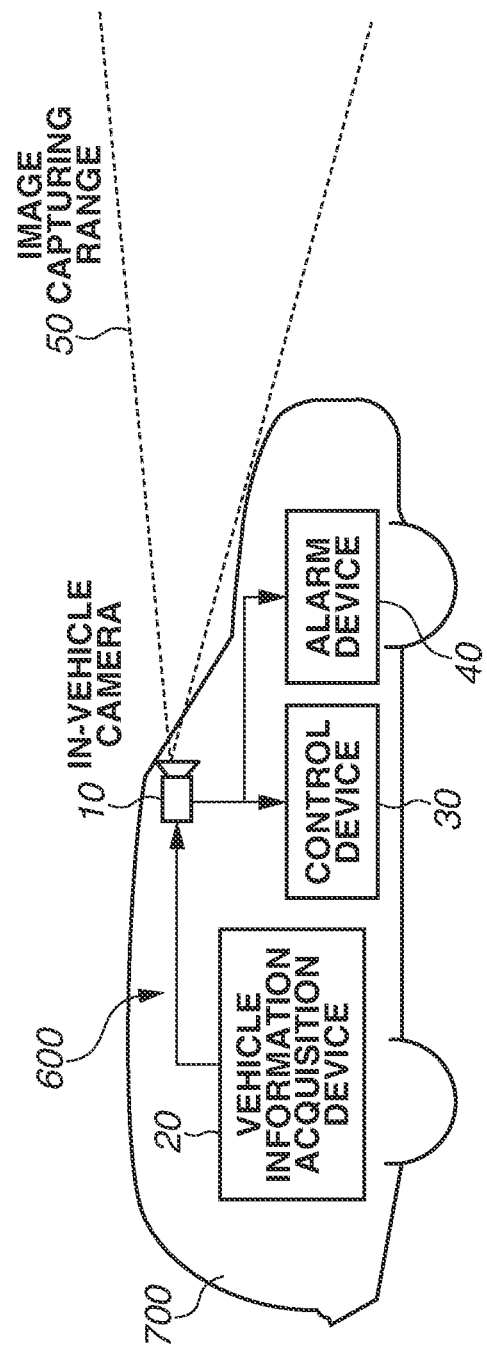
FIG. 11 is a schematic diagram of a vehicle according to the exemplary embodiment.

FIG. 10 is a diagram illustrating the configurations of an in-vehicle camera 10 according to the present exemplary embodiment and an in-vehicle camera system (driving assistance apparatus) 600 including the in-vehicle camera 10. The in-vehicle camera system 600 is an apparatus installed in a vehicle such as an automobile and for assisting the driving of the vehicle based on image information regarding the periphery of the vehicle acquired by the in-vehicle camera 10. FIG. 11 is a schematic diagram illustrating a vehicle 700 including the in-vehicle camera system 600. FIG. 11 illustrates a case where an image capturing range 50 of the in-vehicle camera 10 is set in the front direction of the vehicle 700. Alternatively, the image capturing range 50 can be set in the rear direction of the vehicle 700.

As illustrated in FIG. 10, the in-vehicle camera system 600 includes the in-vehicle camera 10, a vehicle information acquisition device 20, a control device (electronic control unit (ECU)) 30, and an alarm device 40. Further, the in-vehicle camera 10 includes an image capturing unit 1, an image processing unit 2, a parallax calculation unit 3, a distance calculation unit 4, and a collision determination unit 5. The image processing unit 2, the parallax calculation unit 3, the distance calculation unit 4, and the collision determination unit 5 form a processing unit. The image capturing unit 1 has the optical system according to any of the above exemplary embodiments and an imaging plane phase difference sensor.

Figure 12:
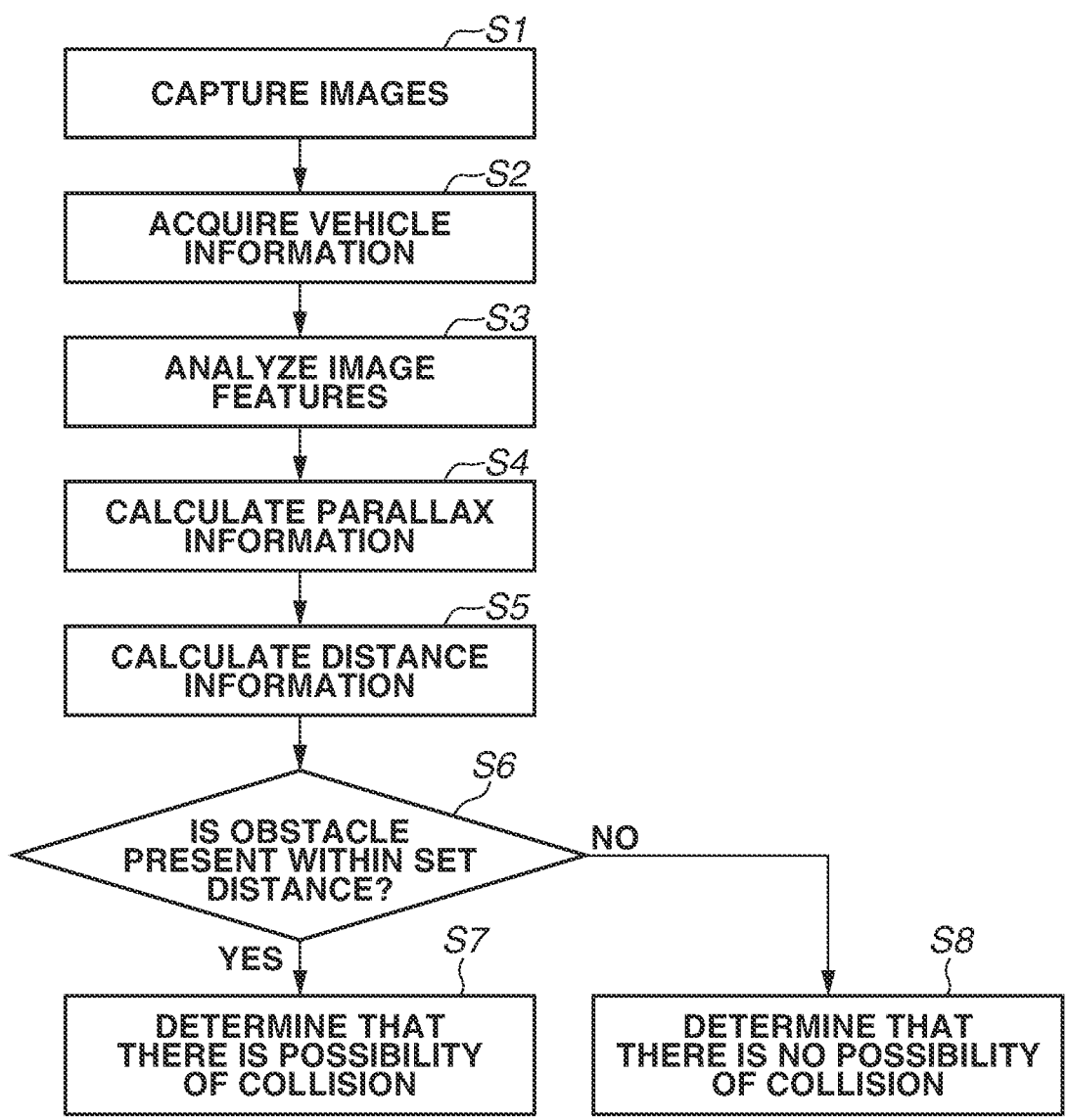
FIG. 12 is a flowchart illustrating an example of an operation of the in-vehicle camera system according to the exemplary embodiment.

FIG. 12 is a flowchart illustrating an example of the operation of the in-vehicle camera system 600 according to the present exemplary embodiment. According to this flowchart, the operation of the in-vehicle camera system 600 is described below.

First, in step S1, a target object (an object) in the periphery of the vehicle 700 is captured using the image capturing unit 1, and a plurality of pieces of image data (parallax image data) are acquired.

Further, in step S2, vehicle information is acquired from the vehicle information acquisition device 20. The vehicle information is information including the speed, the yaw rate, and the steering angle of the vehicle 700.

In step S3, the image processing unit 2 performs image processing on the plurality of pieces of image data acquired by the image capturing unit 1. Specifically, the image processing unit 2 performs image feature analysis for analyzing feature amounts such as the amount and the direction of an edge in the image data and the density value of the image data. This image feature analysis can be performed on each of the plurality of pieces of image data, or can be performed on only some of the plurality of pieces of image data.

In step S4, the parallax calculation unit 3 calculates parallax (image shift) information regarding the parallax between the plurality of pieces of image data acquired by the image capturing unit 1. As a calculation method for calculating the parallax information, a known method such as a sequential similarity detection algorithm (SSDA) method or an area correlation method can be used. Thus, the calculation method is not described in the present exemplary embodiment. The processes of steps S2, S3, and S4 can be performed in the above order, or can be performed in parallel with each other.

In step S5, the distance calculation unit 4 calculates distance information regarding the distance from the target object captured by the image capturing unit 1. The distance information can be calculated based on the parallax information calculated by the parallax calculation unit 3 and internal parameters and external parameters of the image capturing unit 1. This distance information is information regarding the position relative to the target object, such as the distance from the target object, the amount of defocus, or the amount of image shift, and may directly represent the distance value of the target object in an image, or may indirectly represent information corresponding to the distance value.

Then, in step S6, the collision determination unit 5 determines whether the distance information calculated by the distance calculation unit 4 is included in the range of a set distance set in advance. Consequently, it is possible to determine whether an obstacle is present within the set distance in the periphery of the vehicle 700, and determine the possibility of collision between the vehicle 700 and the obstacle. In a case where an obstacle is present within the set distance (YES in step S6), then in step S7, the collision determination unit 5 determines that there is a possibility of collision. In a case where an obstacle is not present within the set distance (NO in step S6), then in step S8, the collision determination unit 5 determines that there is no possibility of collision.

Next, in a case where it is determined in step S7 that there is a possibility of collision, the collision determination unit 5 notifies the control device 30 and the alarm device 40 of the determination result. At this time, based on the determination result of the collision determination unit 5, the control device 30 controls the vehicle 700. Based on the determination result of the collision determination unit 5, the alarm device 40 gives an alarm.

For example, the control device 30 performs control to apply a brake to the vehicle 700, return the gas pedal of the vehicle 700, or generate a control signal for producing a braking force in each wheel of the vehicle 700, to suppress the output of the engine or the motor of the vehicle 700. Further, the alarm device 40 warns a user (a driver) of the vehicle 700 by setting off an alarm such as a sound, displaying alarm information on a screen of an automotive navigation system, or imparting a vibration to a seat belt or the steering wheel.

Based on the in-vehicle camera system 600 according to the present exemplary embodiment, it is possible, by the above processing, to effectively detect an obstacle and avoid collision between a vehicle and the obstacle. Particularly, the optical system according to each of the above exemplary embodiments is applied to the in-vehicle camera system 600, whereby it is possible to improve the degree of freedom in placing the in-vehicle camera 10 by downsizing the whole of the in-vehicle camera 10, and also detect an obstacle and determine collision over a wide viewing angle.

In the present exemplary embodiment, a description has been given of the configuration in which the in-vehicle camera 10 includes only a single image capturing unit 1 having an imaging plane phase difference sensor. The present invention, however, is not limited to this. Alternatively, a stereo camera including two image capturing units may be employed as the in-vehicle camera 10. In this case, the two image capturing units are synchronized with each other and simultaneously acquire pieces of image data, whereby it is possible, using the two pieces of image data, to perform processing similar to that described above without even using an imaging plane phase difference sensor. If, however, the difference between the image capturing times of the two image capturing units is known, the two image capturing units may not need to be synchronized with each other.

Further, as the calculation of distance information, various exemplary embodiments are possible. As an example, a case is described where a pupil division type image sensor having a plurality of pixel portions regularly arranged in a two-dimensional array is employed as an image sensor included in the image capturing unit 1. In the pupil division type image sensor, each pixel portion includes a microlens and a plurality of photoelectric conversion units. Thus, the pupil division type image sensor can receive a pair of beams passing through different regions in the pupil of an optical system and output a pair of pieces of image data from each photoelectric conversion unit.

Then, the amount of image shift in each region is calculated by calculating the correlation between the pair of pieces of image data. Then, the distance calculation unit 4 calculates image shift map data representing the distribution of the amounts of image shift. Alternatively, the distance calculation unit 4 can further convert the calculated amount of image shift into the amount of defocus and generate defocus map data representing the distribution of the amounts of defocus (the distribution on a two-dimensional plane of a captured image). Further, the distance calculation unit 4 can acquire distance map data representing the distance from a target object converted from the amount of defocus.

In the present exemplary embodiment, the in-vehicle camera system 600 is applied to driving assistance (collision damage reduction). The present invention, however, is not limited to this. Alternatively, the in-vehicle camera system 600 can be applied to cruise control (including cruise control with an all-speed tracking function) or automatic driving. Further, the in-vehicle camera system 600 can be applied not only to a vehicle such as a motor vehicle but also to a moving body (a moving apparatus) such as a vessel, an aircraft, or an industrial robot. Further, the in-vehicle camera 10 according to the present exemplary embodiment can be applied not only to a moving body but also to a device widely using object recognition, such as an intelligent transportation system (ITS).

A detailed description is given of a case where the optical system according to each of the above exemplary embodiments is applied as a distance measuring optical system to a distance measuring apparatus such as the in-vehicle camera 10. As described above, the vertical viewing angle of the optical system according to each of the exemplary embodiments is set on only one side with respect to the optical axis A. Thus, in a case where the optical system is applied to the in-vehicle camera 10, and the in-vehicle camera 10 is installed in a vehicle, it is desirable to place the optical system such that the optical axis A is not parallel to the horizontal direction.

For example, in a case where the optical system according to each of the above exemplary embodiments is employed as a distance measuring optical system, it is desirable that the optical system should be placed such that the optical axis A is inclined upward with respect to the horizontal direction, to bring the center of the vertical viewing angle close to the horizontal direction. Alternatively, each optical system is rotated 180° (turned upside down) about the X-axis and then placed such that the optical axis A is inclined downward with respect to the horizontal direction. Consequently, it is possible to appropriately set the image capturing range of the in-vehicle camera 10.

In the optical system according to each of the exemplary embodiments, however, the image forming performance is highest in the on-axis portion, whereas the image forming performance decreases at peripheral viewing angles. Thus, it is more desirable to place the optical system such that light from an object to which attention is paid passes near the on-axis portion in the optical system. For example, in a case where the in-vehicle camera 10 needs to pay attention to a sign or an obstacle on a road, it is desirable to improve the image forming performance at a viewing angle on the lower side (the ground side) than the upper side (the sky side) with respect to the horizontal direction. In this case, in a case where the optical system according to each of the exemplary embodiments is employed, then as described above, each optical system may be turned upside down and then placed such that the optical axis A is inclined downward with respect to the horizontal direction, to direct a viewing angle near the optical axis A downward.

[Projection Apparatus]

In a case where the optical system according to each of the above exemplary embodiments is applied as a projection optical system to a projection apparatus, a display surface of a display element, such as a liquid crystal panel (a spatial modulator), is placed at the position of a reduction plane of the optical system. However, in a case where the optical system is applied to a projection apparatus, the physical body side and the image side are reversed, and the direction of an optical path is opposite. That is, it is possible to employ a configuration in which an image displayed on the display surface (the reduction plane) of the display element placed on the physical body side is projected (formed) by the optical system on a plane of projection (an enlargement plane), such as a screen, placed on the image side. Also in this case, similarly to a case where the optical system is applied to an image capturing apparatus, it is desirable that the conditional expressions in the exemplary embodiments should be satisfied.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-144397, filed Jul. 26, 2017, which is hereby incorporated by reference herein in its entirety.

What is claimed is:

1. An optical system comprising:
a first optical element including a first reflecting region having a convex shape toward an enlargement side;
a second optical element having a reduction-side surface having a convex shape toward the enlargement side; and
a third optical element having an enlargement-side surface having a convex shape toward the enlargement side,
wherein the reduction-side surface of the second optical element or the enlargement-side surface of the third optical element includes a second reflecting region,
wherein the third optical element includes a refracting region having positive power,
wherein light enters the enlargement side by entering the first optical element from the side of the first optical element furthest from the second optical element with respect to the first optical element proceeds to a reduction side sequentially via a refracting region of the first optical element, the second reflecting region, the first reflecting region, a refracting region of the second optical element, and the refracting region of the third optical element, and
wherein the following conditional expression is satisfied:

$$2.0 \leq R1/L1 \leq 5.5$$

where a radius of curvature of a closest refracting surface, that is closest to the first optical element among refracting surfaces located on the reduction side of the first optical element, is R1, and a distance between the closest refracting surface and an optical surface including the second reflecting region is L1.

2. The optical system according to claim 1, wherein the following conditional expression is satisfied:

$$0.3 \leq Lg/Lm \leq 0.95$$

where a total thickness of optical elements present between the first reflecting region and the second reflecting region is Lg, and a distance between an optical surface including the first reflecting region and an optical surface including the second reflecting region is Lm.

3. The optical system according to claim 1, wherein the following conditional expression is satisfied:

$$0.7 \leq Rp/Rn \leq 1.3$$

where a radius of curvature of an optical surface including the first reflecting region is Rp, and a radius of curvature of an optical surface including the second reflecting region is Rn.

4. The optical system according to claim 1, wherein a refractive index of a medium between the first optical element and the second optical element is smaller than a refractive index of the second optical element.

5. The optical system according to claim 1, wherein the second reflecting region includes a reflecting portion configured to reflect a part of the light, and a light-blocking portion configured to block a part of the light.

6. The optical system according to claim 5, wherein a diameter of the reflecting portion in a first direction perpendicular to an optical axis is larger than a diameter of the reflecting portion in a second direction perpendicular to the optical axis and the first direction, and the first reflecting region is located on one side with respect to the optical axis in the second direction.

7. The optical system according to claim 1, wherein the first reflecting region is included in a reduction-side surface of the first optical element.

8. The optical system according to claim 1, wherein the first optical element includes a refracting region having positive power.

9. The optical system according to claim 8, wherein the first optical element is a positive meniscus lens.

10. The optical system according to claim 1, wherein the second reflecting region is included in the reduction-side surface of the second optical element.

11. The optical system according to claim 1, wherein the second optical element includes a refracting region having negative power.

12. The optical system according to claim 1, wherein an enlargement-side surface of the second optical element has a convex shape toward the enlargement side.

13. The optical system according to claim 1, wherein a reduction-side surface of the third optical element has a concave shape toward the enlargement side.

14. An image capturing apparatus comprising:
an image sensor configured to capture a physical body; and
the optical system according to claim 1 configured to form an image of the physical body on an imaging surface of the image sensor.

15. A distance measuring apparatus comprising:
the image capturing apparatus according to claim 14 configured to acquire image data of a physical body; and
a distance calculation unit configured to acquire distance information regarding a distance from the physical body, based on the image data.

16. An in-vehicle camera system comprising:
the distance measuring apparatus according to claim 15; and
a collision determination unit configured to determine whether there is a possibility of collision between a motor vehicle and the physical body, based on the distance information.

17. The in-vehicle camera system according to claim 16, further comprising a control device configured to, in a case where it is determined that there is a possibility of collision between the motor vehicle and the physical body, output a control signal for producing a braking force in each wheel of the motor vehicle.

18. The in-vehicle camera system according to claim 16, further comprising an alarm device configured to, in a case where it is determined that there is a possibility of collision between the motor vehicle and the physical body, give an alarm to a driver of the motor vehicle.

19. A projection apparatus comprising:

a display element configured to display an image; and the optical system according to claim 1 configured to form an image on a display surface of the display element.

20. An optical system comprising:

a first optical element including a first reflecting region having a convex shape toward an enlargement side;

a second optical element having a reduction-side surface having a convex shape toward the enlargement side; and a third optical element having an enlargement-side surface having a convex shape toward the enlargement side, wherein the reduction-side surface of the second optical element or the enlargement-side surface of the third optical element includes a second reflecting region, wherein the third optical element includes a refracting region having positive power, wherein light from the enlargement side proceeds to a reduction side sequentially via a refracting region of the first optical element, the second reflecting region, the first reflecting region, a refracting region of the second optical element, and the refracting region of the third optical element, and wherein the following conditional expression is satisfied:

$$2.0 \leq R1/L1 \leq 5.5$$

where a radius of curvature of a closest refracting surface, that is closest to the first optical element among refracting surfaces located on the reduction side of the first optical element, is R1, and a distance between the closest refracting surface and an optical surface including the second reflecting region is L1.

21. An optical system comprising:

a first optical element including a first reflecting region having a convex shape toward an enlargement side;

a second optical element having a reduction-side surface having a convex shape toward the enlargement side; and a third optical element having an enlargement-side surface having a convex shape toward the enlargement side wherein the reduction-side surface of the second optical element or the enlargement-side surface of the third optical element includes a second reflecting region, wherein the third optical element includes a refracting region having positive power, wherein light from the enlargement side proceeds to a reduction side sequentially via a refracting region of the first optical element, the second reflecting region, the first reflecting region, a refracting region of the second optical element, and the refracting region of the third optical element, wherein the second reflecting region includes a reflecting portion configured to reflect a part of the light, and a light-blocking portion configured to block a part of the light, and wherein a diameter of the reflecting portion in a first direction perpendicular to an optical axis is larger than a diameter of the reflecting portion in a second direction perpendicular to the optical axis and the first direction, and the first reflecting region is located on one side with respect to the optical axis in the second direction.

* * * * *